US009004098B2

(12) United States Patent
Roes

(10) Patent No.: US 9,004,098 B2
(45) Date of Patent: Apr. 14, 2015

(54) PRESSURE REGULATOR FOR WATERING SYSTEM

(75) Inventor: Christopher Richard Roes, Cromwell, IN (US)

(73) Assignee: CTB, Inc., Milford, IN (US)

( * ) Notice: Subject to any disclaimer, the term of this patent is extended or adjusted under 35 U.S.C. 154(b) by 460 days.

(21) Appl. No.: 12/753,322

(22) Filed: Apr. 2, 2010

(65) Prior Publication Data

US 2010/0252126 A1  Oct. 7, 2010

Related U.S. Application Data

(60) Provisional application No. 61/166,532, filed on Apr. 3, 2009.

(51) Int. Cl.
*G05D 16/08* (2006.01)
*F16K 17/02* (2006.01)
*A01K 39/02* (2006.01)
*F16K 17/08* (2006.01)
*F16K 27/02* (2006.01)
*F16K 31/365* (2006.01)
*F16K 31/385* (2006.01)
*G05D 16/06* (2006.01)

(52) U.S. Cl.
CPC ............ *F16K 17/02* (2013.01); *A01K 39/0213* (2013.01); *F16K 17/085* (2013.01); *F16K 27/0236* (2013.01); *F16K 31/365* (2013.01); *F16K 31/385* (2013.01); *G05D 16/0655* (2013.01)

(58) Field of Classification Search
USPC ............ 137/505.14, 505.21, 505.38, 505.39, 137/505.41, 505.42, 522, 523
See application file for complete search history.

(56) References Cited

U.S. PATENT DOCUMENTS 1,485,411 A * 3/1924 Brown et al. ................. 166/331
1,773,604 A   8/1930 Scovel, Jr. et al.
2,198,070 A   8/1938 Wile
(Continued)

FOREIGN PATENT DOCUMENTS

EP  1139193 A2  4/2001
WO  86/01114 A1  2/1986
(Continued)

OTHER PUBLICATIONS

International Search Report, Jun. 7, 2010.
(Continued)

*Primary Examiner* — William McCalister
(74) *Attorney, Agent, or Firm* — Clark Hill PLC

(57) ABSTRACT

A water pressure regulator includes a sealing member and a body having a diaphragm assembly. The diaphragm assembly is positioned and secured within the body to define first and second chambers. The diaphragm assembly has a force acting thereon from within the second chamber. The first chamber defines first and second zones and a passageway therebetween. An inlet of the body is configured to provide water to the first zone and an outlet of the body is configured to deliver water out of the second zone. The sealing member is positioned within the first zone. The sealing member seals the passageway by a force of the water in the first zone acting upon the sealing member and by a gravitational force acting upon the sealing member. The sealing member is formed in the shape of a spherical ball. The water pressure regulator may be used in a watering system.

33 Claims, 16 Drawing Sheets

(56) References Cited

U.S. PATENT DOCUMENTS

| | | | |
|---|---|---|---|
| 2,261,364 A | 11/1941 | Grove | |
| 2,703,099 A | 3/1955 | Smallegan | |
| 2,835,270 A | 5/1958 | York et al. | |
| 3,117,591 A | 1/1964 | Schutmaat | |
| 3,856,042 A * | 12/1974 | Fletcher et al. | 137/505.42 |
| 3,933,277 A | 1/1976 | Volat et al. | |
| 4,375,223 A | 3/1983 | Baillie | |
| 4,481,971 A | 11/1984 | Farrell et al. | |
| 4,589,373 A | 5/1986 | Hostetler et al. | |
| 4,635,848 A | 1/1987 | Little | |
| 4,872,474 A | 10/1989 | Middleton et al. | |
| 4,922,956 A | 5/1990 | Taube, Sr. et al. | |
| 4,991,621 A | 2/1991 | Steudler, Jr. | |
| 5,070,903 A | 12/1991 | Steudler, Jr. | |
| 5,159,952 A | 11/1992 | Ono | |
| 5,174,331 A | 12/1992 | Steudler, Jr. | |
| 5,228,469 A | 7/1993 | Otten et al. | |
| 5,247,963 A | 9/1993 | Hostetler et al. | |
| 5,275,203 A | 1/1994 | Robinson | |
| 5,303,778 A | 4/1994 | Vari | |
| 5,305,982 A | 4/1994 | Tamari | |
| 5,402,750 A | 4/1995 | Katz | |
| 5,522,346 A | 6/1996 | Clark, IV | |
| 5,765,588 A | 6/1998 | Katz | |
| 5,771,921 A | 6/1998 | Johnson | |
| 5,794,849 A | 8/1998 | Elder | |
| 5,848,494 A | 12/1998 | Spelt | |
| 5,850,946 A | 12/1998 | Keller et al. | |
| 5,967,167 A | 10/1999 | Johnson | |
| 5,967,181 A | 10/1999 | Momont et al. | |
| 6,059,148 A | 5/2000 | Keller et al. | |
| 6,098,959 A | 8/2000 | Momont et al. | |
| 6,164,311 A | 12/2000 | Momont et al. | |
| 6,202,682 B1 | 3/2001 | Johnson | |
| 6,450,121 B1 | 9/2002 | Schumacher | |
| 6,553,937 B1 * | 4/2003 | Cheng | 119/72.5 |
| 6,712,021 B2 | 3/2004 | Pollock | |
| 6,758,165 B2 | 7/2004 | Pappas et al. | |
| 6,971,403 B2 | 12/2005 | Heald et al. | |
| 7,117,818 B2 | 10/2006 | Pappas et al. | |
| 7,219,689 B2 | 5/2007 | Pollock et al. | |
| 2006/0168611 A1 | 7/2006 | Fima | |

FOREIGN PATENT DOCUMENTS

| | | |
|---|---|---|
| WO | 99/32817 A1 | 7/1999 |
| WO | 03/051104 A2 | 6/2003 |
| WO | 2004/012501 A1 | 2/2004 |
| WO | 2007/010284 A2 | 1/2007 |
| WO | 2007/140519 A1 | 12/2007 |

OTHER PUBLICATIONS

Written Opinion of the International Searching Authority, Jun. 7, 2010.

* cited by examiner

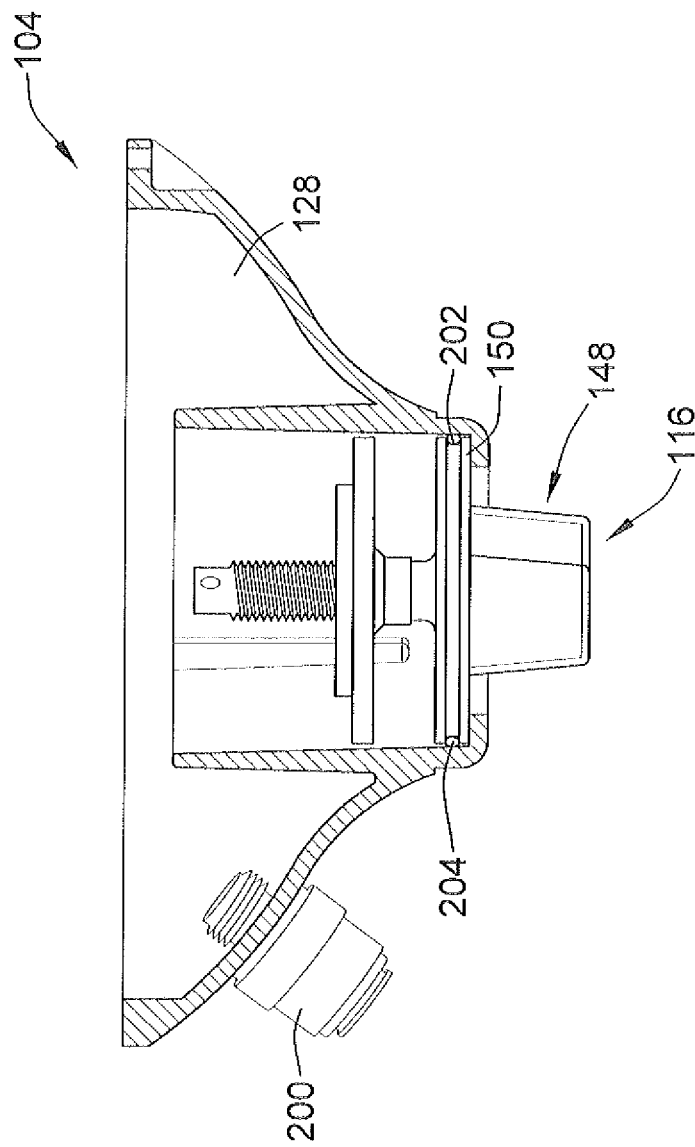

PRESSURE REGULATOR FOR WATERING SYSTEM

CROSS-REFERENCE AND INCORPORATION BY REFERENCE

This application claims the domestic priority of U.S. Provisional Application Ser. No. 61/166,532, filed on Apr. 3, 2009, and entitled "Pressure Regulator For Watering System". U.S. Provisional Application Ser. No. 61/166,532 is hereby incorporated by reference in its entirety.

BACKGROUND

This disclosure relates to a water pressure regulator and a watering system having one or more water pressure regulators.

Prior art water pressure regulators, such as the ones described and illustrated in U.S. Pat. Nos. 5,967,167 and 6,202,682, have a regulating valve, positioned in an outlet or reduced pressure chamber, connected to a flexible diaphragm. Increased water pressure in the outlet pressure chamber causes the flexible diaphragm to move, and thus the regulating valve to move, such that the regulating valve prevents pressurized water from a supply source from entering the outlet pressure chamber. Conversely, decreased water pressure in the outlet pressure chamber causes the flexible diaphragm to move, and thus the regulating valve to move, such that the regulating valve allows pressurized water from the supply source to enter the outlet pressure chamber.

Such water pressure regulators have a number of disadvantages/drawbacks. For instance, these water pressure regulators rely on the force of the water in the outlet pressure chamber to push down on a diaphragm in order to prevent pressurized water from the supply source from entering the outlet pressure chamber. However, when the regulating valve closes off the flow of pressurized water from the supply source to the outlet pressure chamber, the water flowing from the supply source continues to flow toward the outlet pressure chamber and the force thereof can cause the regulating valve to undesirably and repeatedly open and close (i.e., water hammer), because it is located within the outlet pressure chamber. Water hammer can result in wear and tear on the regulating valve and the diaphragm and, further can result in possible leakage in the downstream watering lines, i.e., at the individual watering valves (nipples). Further, the design of prior art regulating valves can cause them to begin to lose their effective seals over time due to build-up of foreign material on the regulating valve; this can also decrease the life of the sealing mechanism due to wear.

BRIEF SUMMARY

A water pressure regulator is provided that has a body and a sealing member. The water pressure regulator may be provided in a watering system that also has a water source and first and second water delivery assemblies. The first water delivery assembly connects the water source to an inlet of the water pressure regulator, thereby providing water to the water pressure regulator at a relatively high pressure, generally approximately between 15 and 35 psi, and the second water delivery assembly connects to an outlet of the water pressure regulator, thereby delivering water from the water pressure regulator at a relatively low pressure, generally approximately 1 psi or less.

In a preferred embodiment of the water pressure regulator, the body has an inlet, an outlet, and a diaphragm assembly which is positioned and secured within the body in order to define first and second chambers. The diaphragm assembly has a force acting thereon from within the second chamber. The first chamber further defines first and second zones and a passageway therebetween. The inlet is configured to provide water to the first zone and the outlet is configured to deliver water out of the second zone. The sealing member is positioned within the first zone. The sealing member seals the passageway between the first zone and the second zone when the force acting on the diaphragm assembly from within the second chamber is less than or equal to forces in the first chamber that collectively prevent the diaphragm assembly from unsealing the passageway. The diaphragm assembly is configured to move the sealing member to unseal the passageway, such that the water in the first zone is allowed to move into the second zone through the passageway, when the force acting on the diaphragm assembly from within the second chamber is greater than the forces in the first chamber.

In another preferred embodiment of the water pressure regulator, the body has an inlet, an outlet, and a diaphragm assembly which is positioned and secured within the body in order to define first and second chambers. The first chamber further defines first and second zones and a passageway therebetween. The inlet is configured to provide water to the first zone and the outlet is configured to deliver water out of the second zone. The sealing member has a force acting thereon for sealing the passageway, with the force being at least one of a force of the water in the first zone acting upon the sealing member, and a gravitational force acting upon the sealing member due to a weight of the sealing member.

In another preferred embodiment of the water pressure regulator, the body has an inlet, an outlet, and a diaphragm assembly which is positioned and secured within the body in order to define first and second chambers. The first chamber further defines first and second zones and a passageway therebetween. The inlet is configured to provide water to the first zone at a relatively high pressure and the outlet is configured to deliver water out of the second zone at a relatively low pressure. The sealing member is configured to seal the passageway and the sealing member is formed in the shape of a spherical ball.

In yet another preferred embodiment of the water pressure regulator, the body has an inlet, an outlet, and a diaphragm assembly which is positioned and secured within the body in order to define first and second chambers. The first chamber further defines first and second zones and a passageway therebetween. The inlet is configured to provide water to the first zone and the outlet is configured to deliver water out of the second zone. The sealing member is configured to seal the passageway without relying on any of a force of the water in the second zone acting upon the diaphragm assembly, a gravitational force acting upon the diaphragm assembly due to a weight of the water in the second zone, and a force acting upon the diaphragm assembly from the second chamber.

BRIEF DESCRIPTION OF THE DRAWINGS

For a more complete understanding of the disclosure, reference may be made to the following detailed description and accompanying drawings wherein like reference numerals identify like elements in which:

FIG. 16 is a cross-sectional view of an alternative embodiment of a lower housing for use in the water pressure regulator wherein a remote pressurized fluid or gas control supply is used to automatically control the pressure in the lower chamber, which overrides the spring assembly.

DETAILED DESCRIPTION

Figure 1:
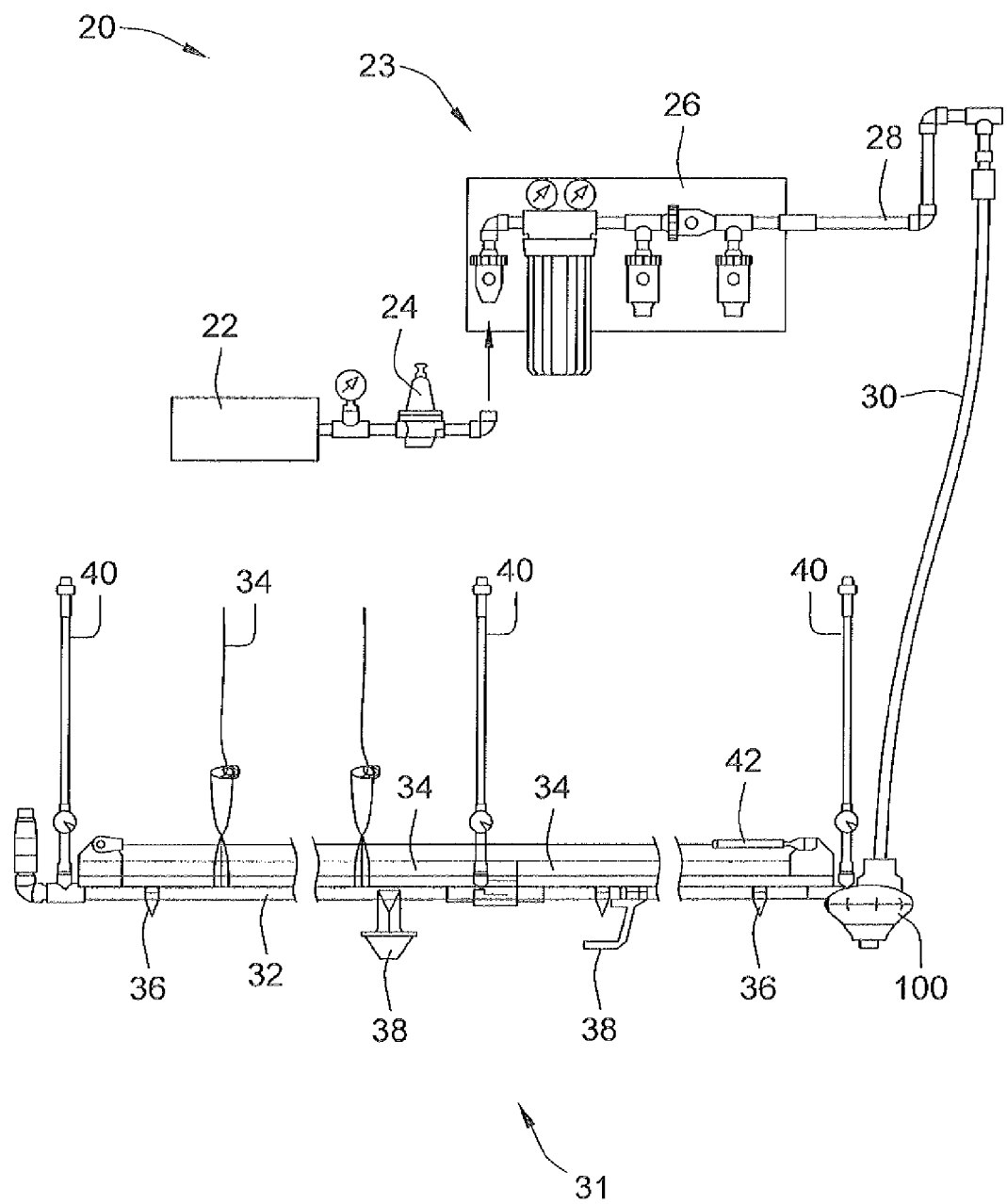
FIG. 1 is a side view of a watering system including a described and preferred embodiment of a water pressure regulator.
Figure 2:
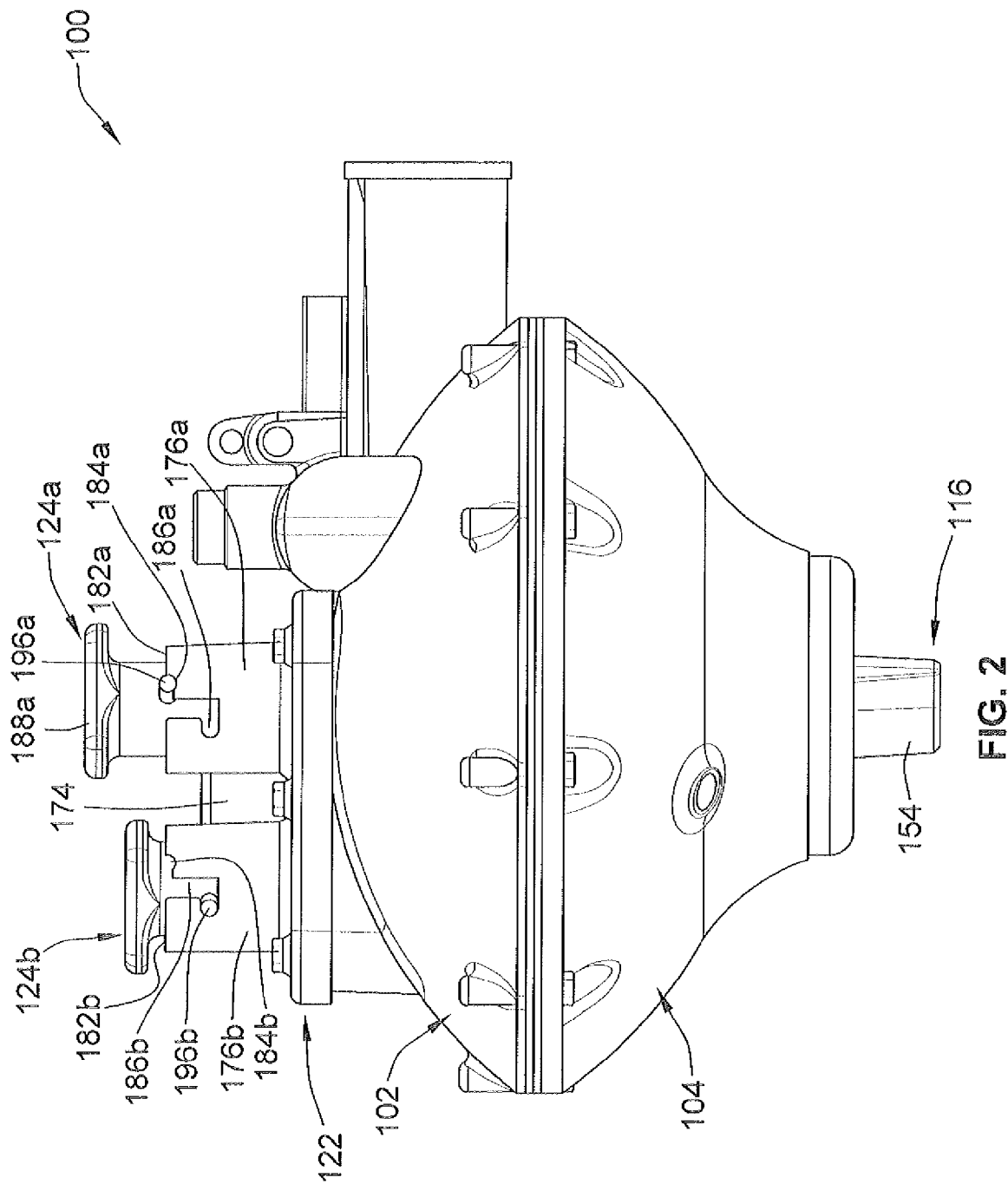
FIG. 2 is a side view of the described embodiment of the water pressure regulator in an "ON" or "REGULATE" mode.
Figure 3:
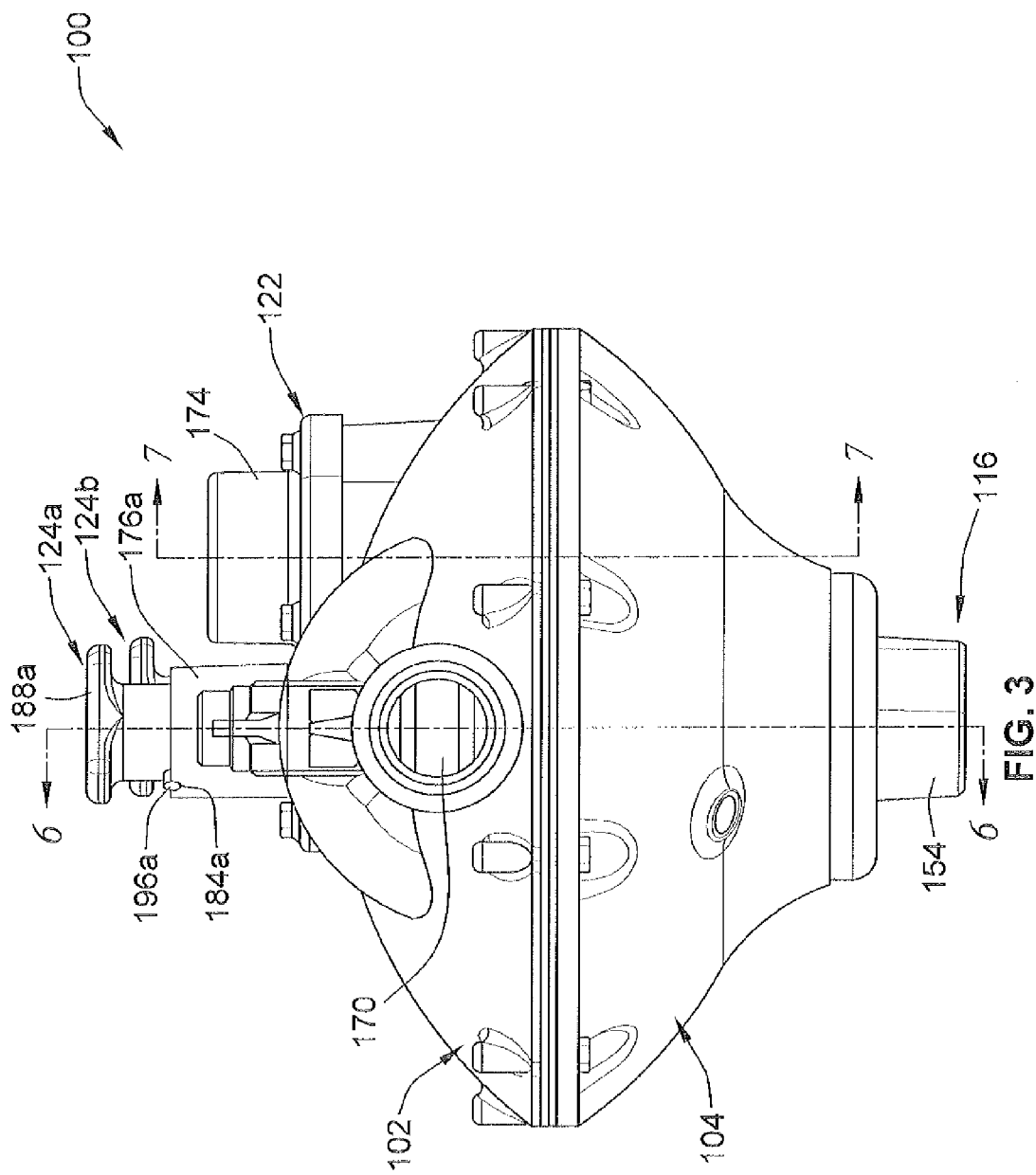
FIG. 3 is an end view of the water pressure regulator illustrated in FIG. 2.
Figure 4:
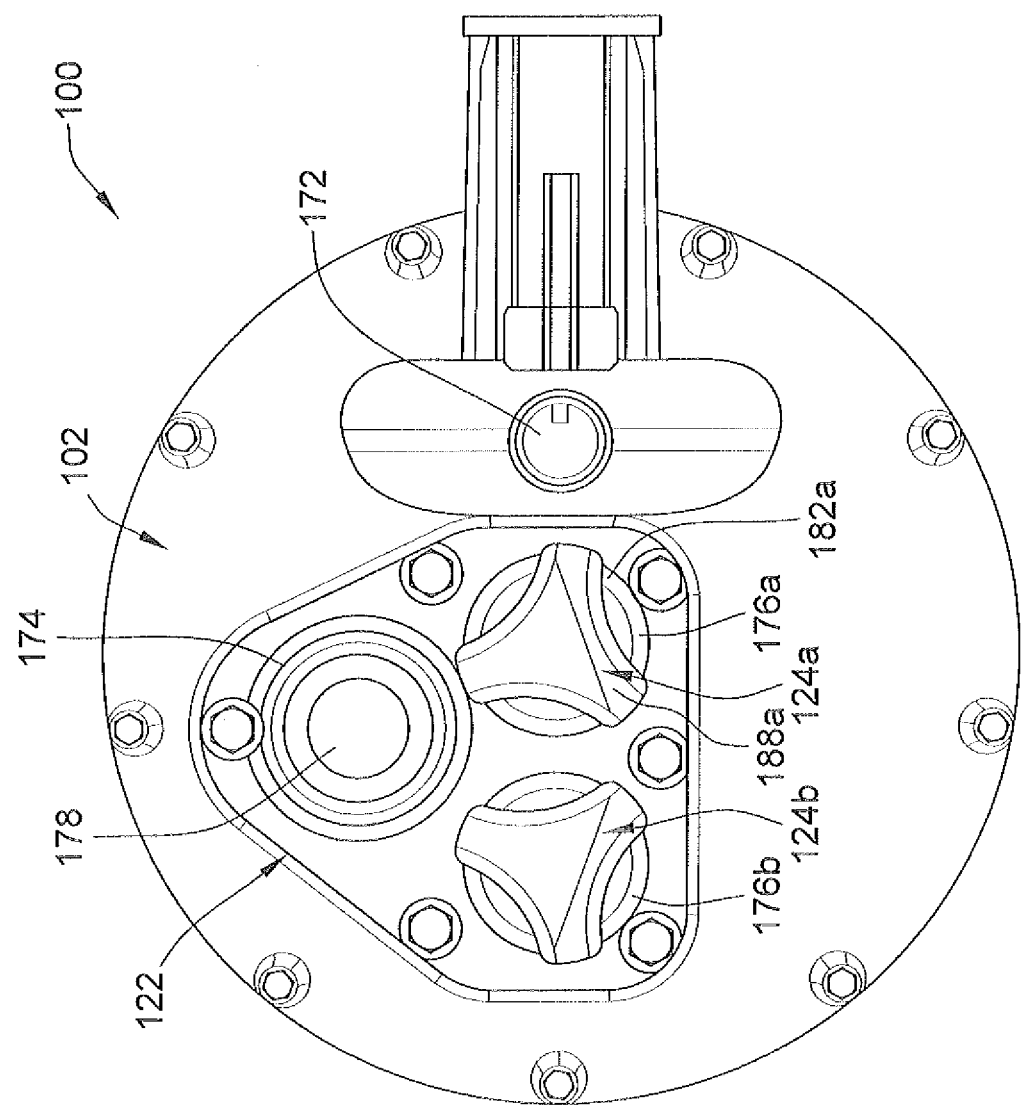
FIG. 4 is a top view of the water pressure regulator illustrated in FIG. 2.
Figure 5:
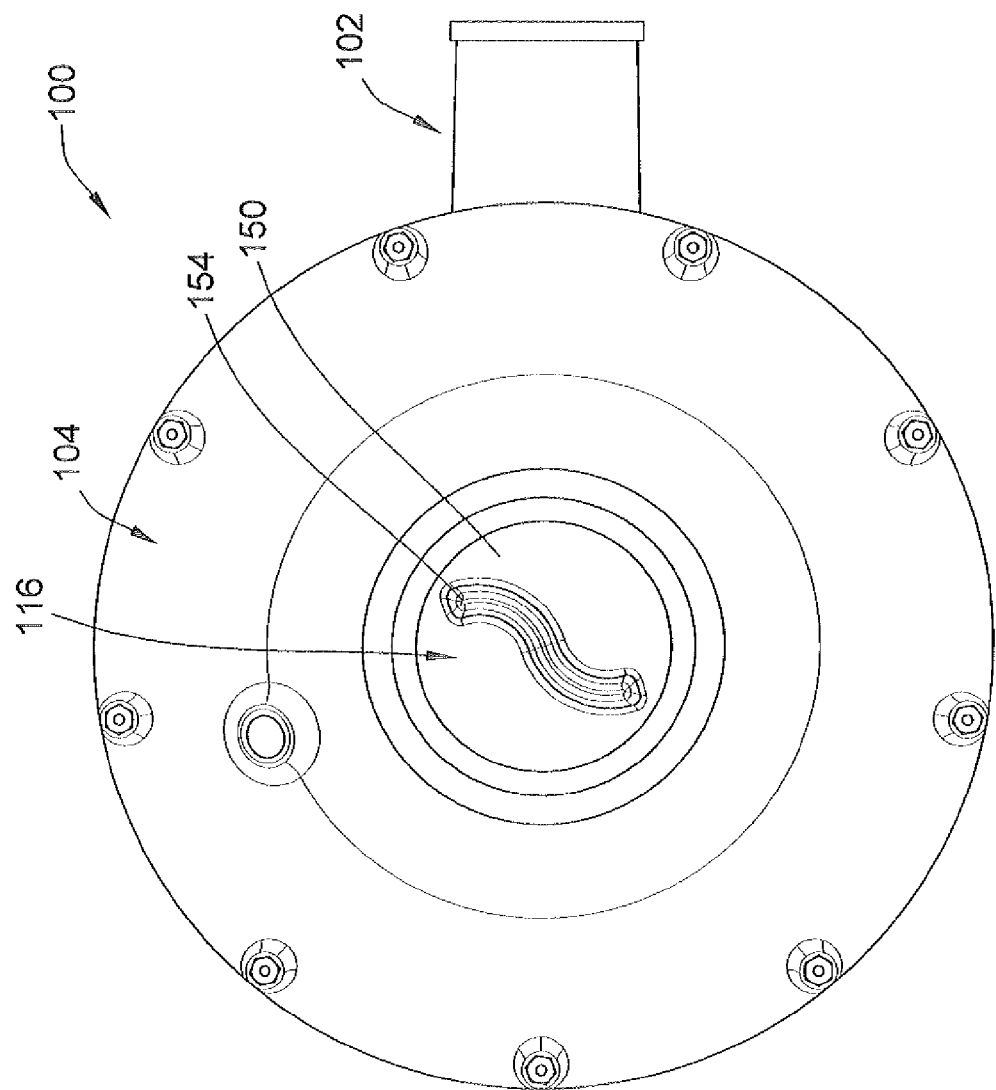
FIG. 5 is a bottom view of the water pressure regulator illustrated in FIG. 2.
Figure 6:
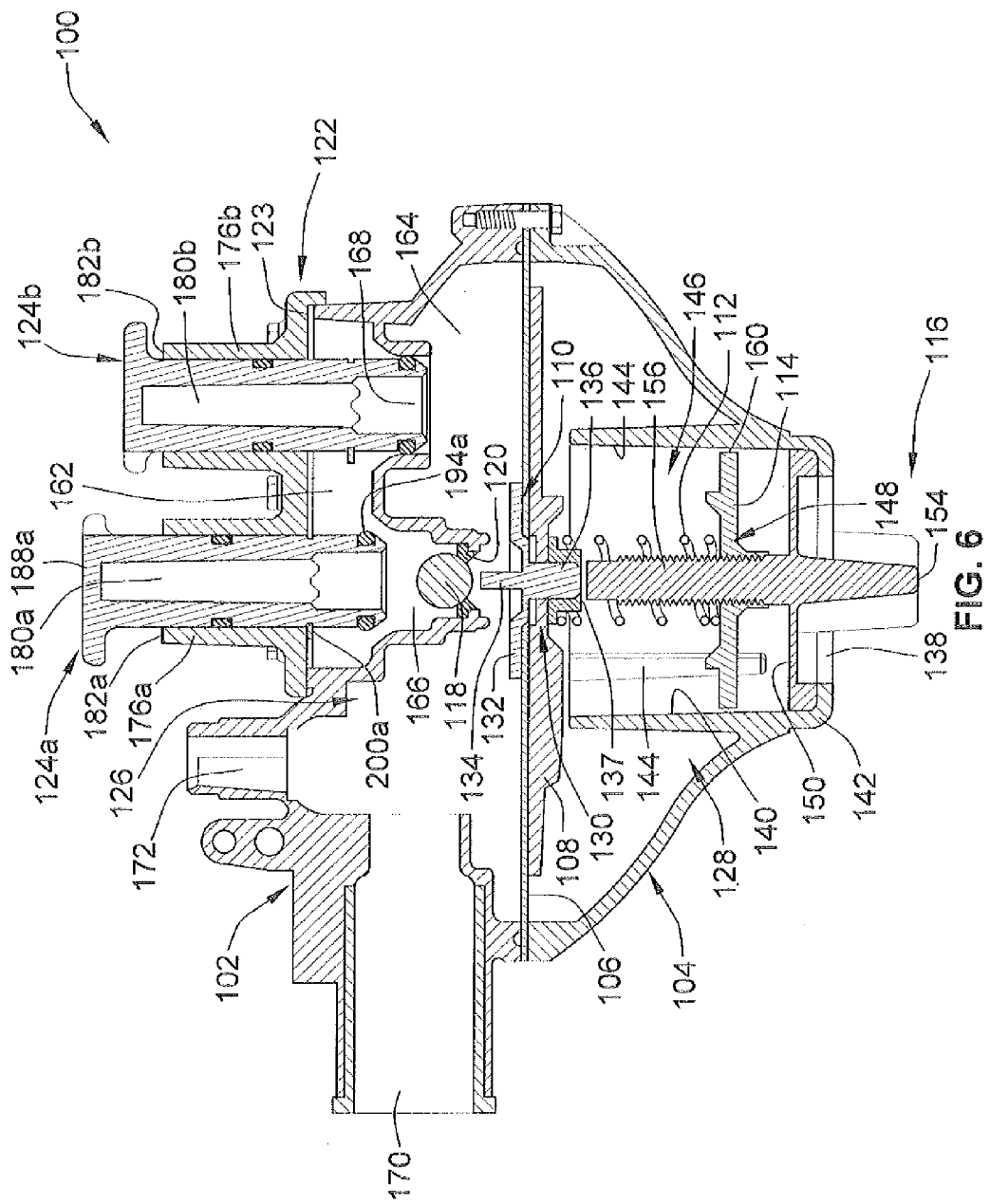
FIG. 6 is a cross-sectional view of the water pressure regulator taken along line 6-6 of FIG. 3.
Figure 7:
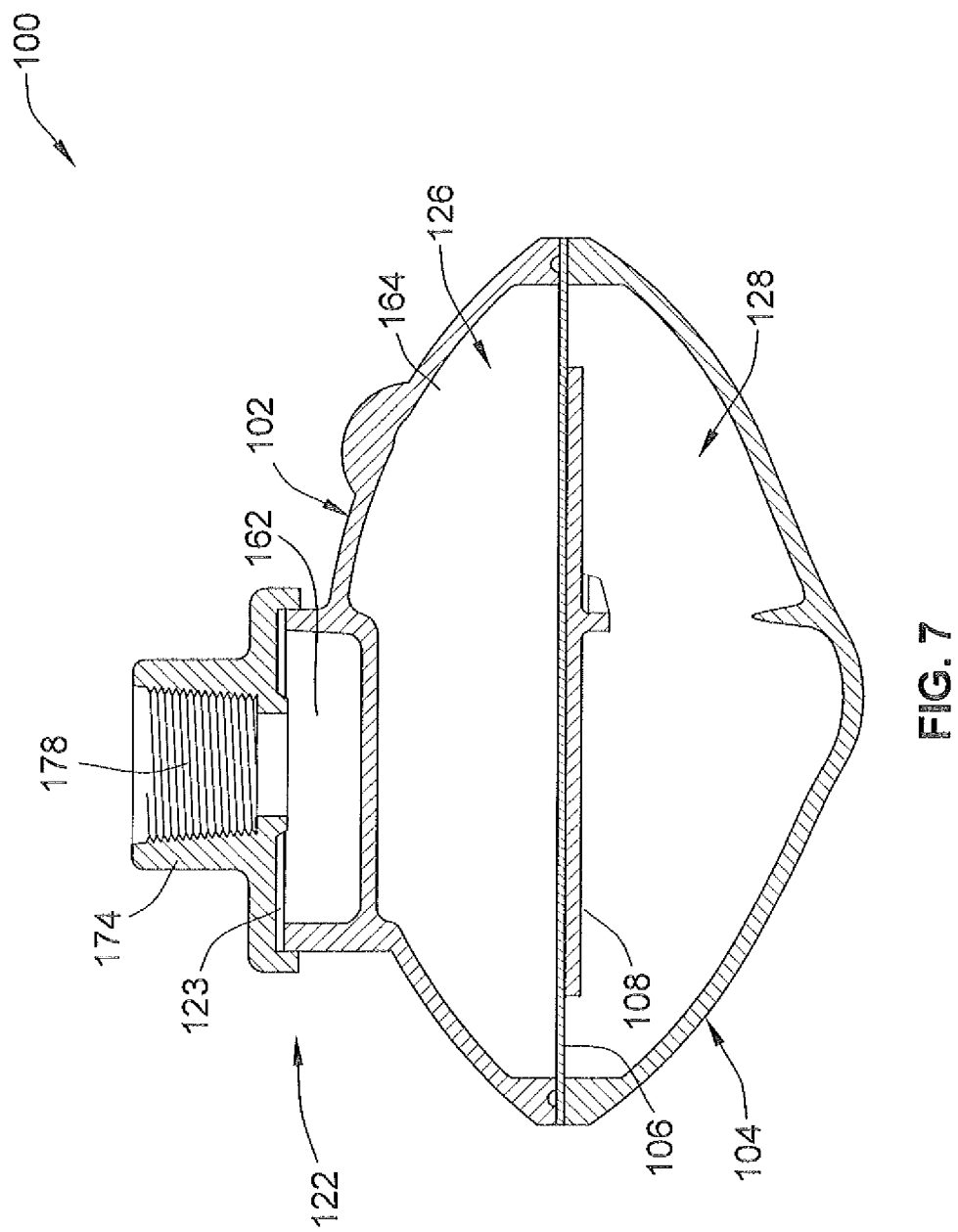
FIG. 7 is a cross-sectional view of the water pressure regulator taken along line 7-7 of FIG. 3.
Figure 8:
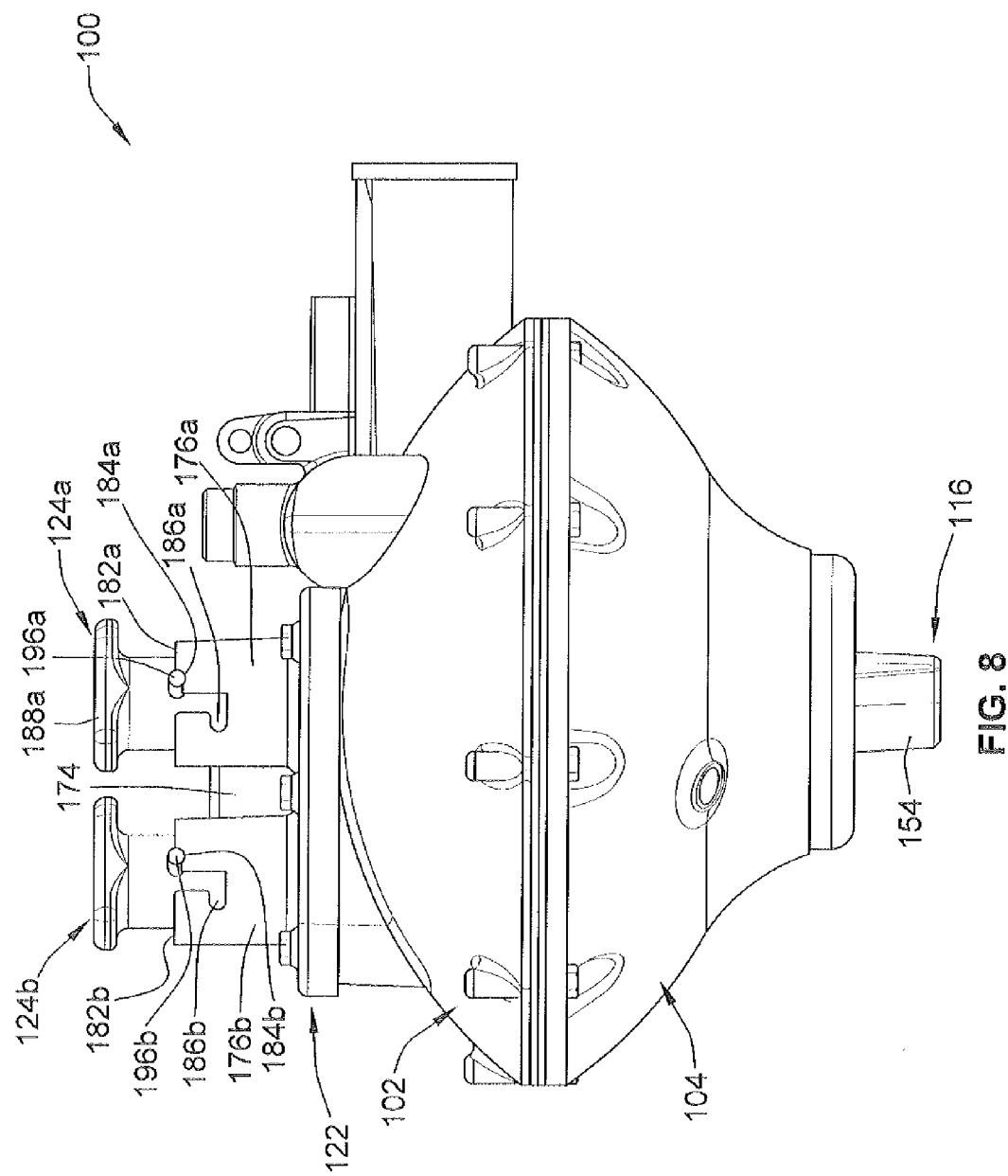
FIG. 8 is a side view of the described embodiment of the water pressure regulator in a "FLUSH" mode.
Figure 9:
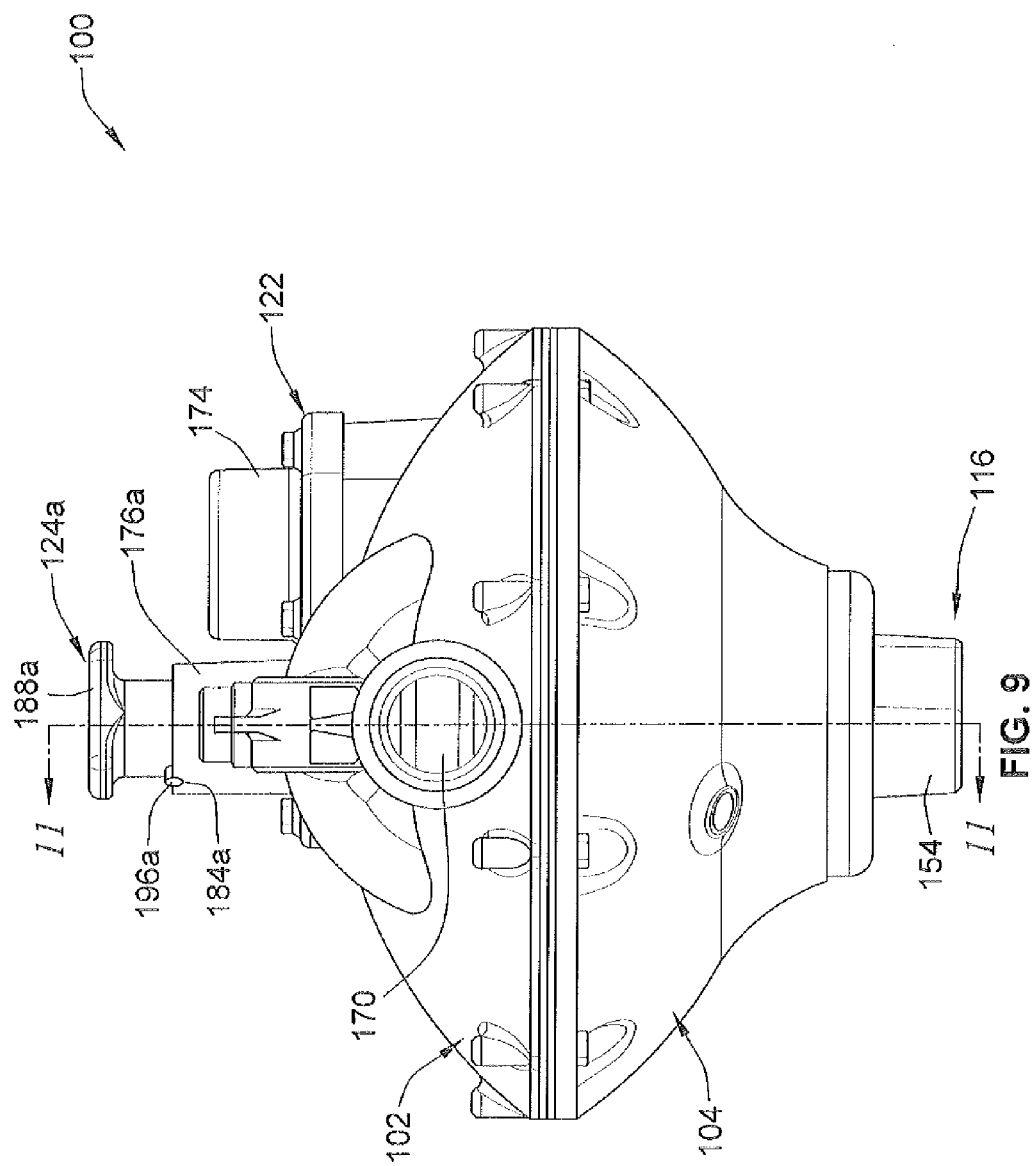
FIG. 9 is an end view of the water pressure regulator illustrated in FIG. 8.
Figure 10:
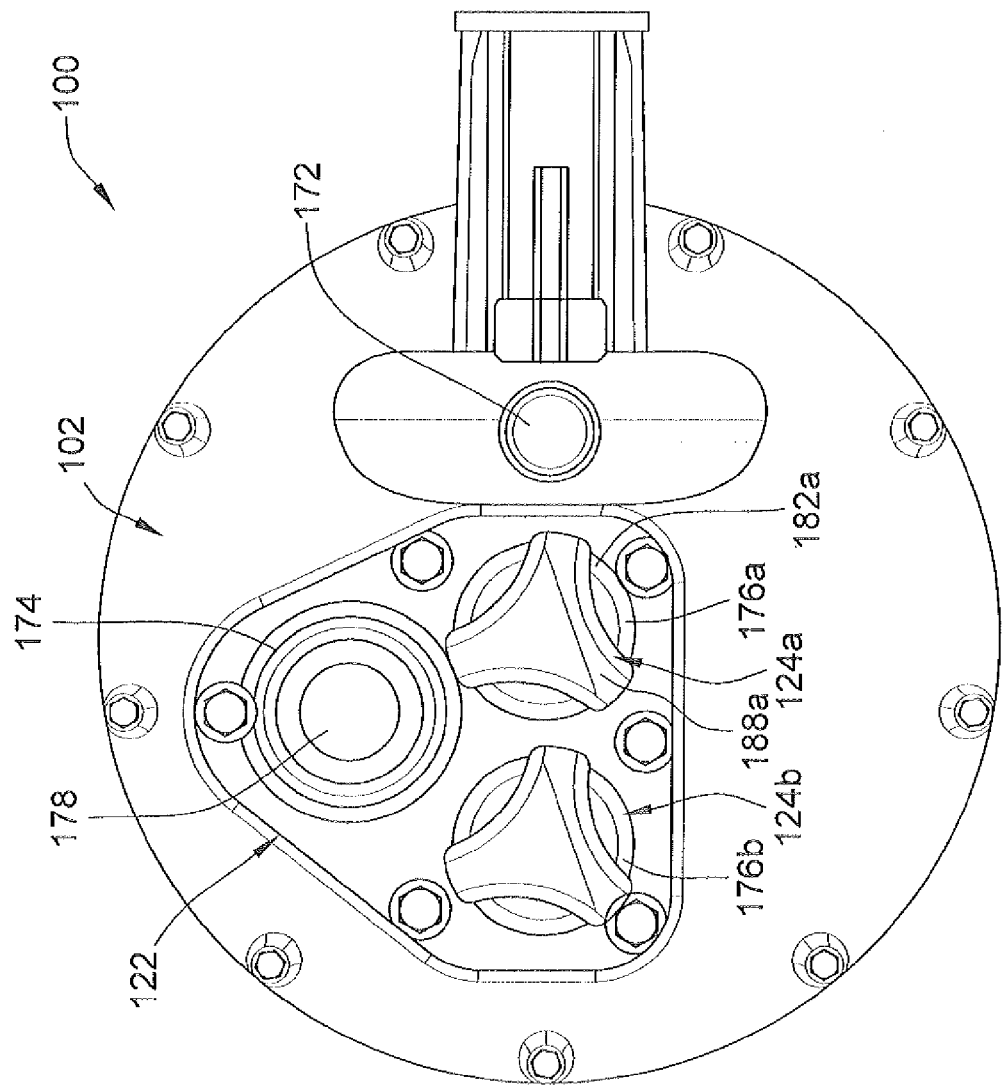
FIG. 10 is a top view of the water pressure regulator illustrated in FIG. 8.
Figure 11:
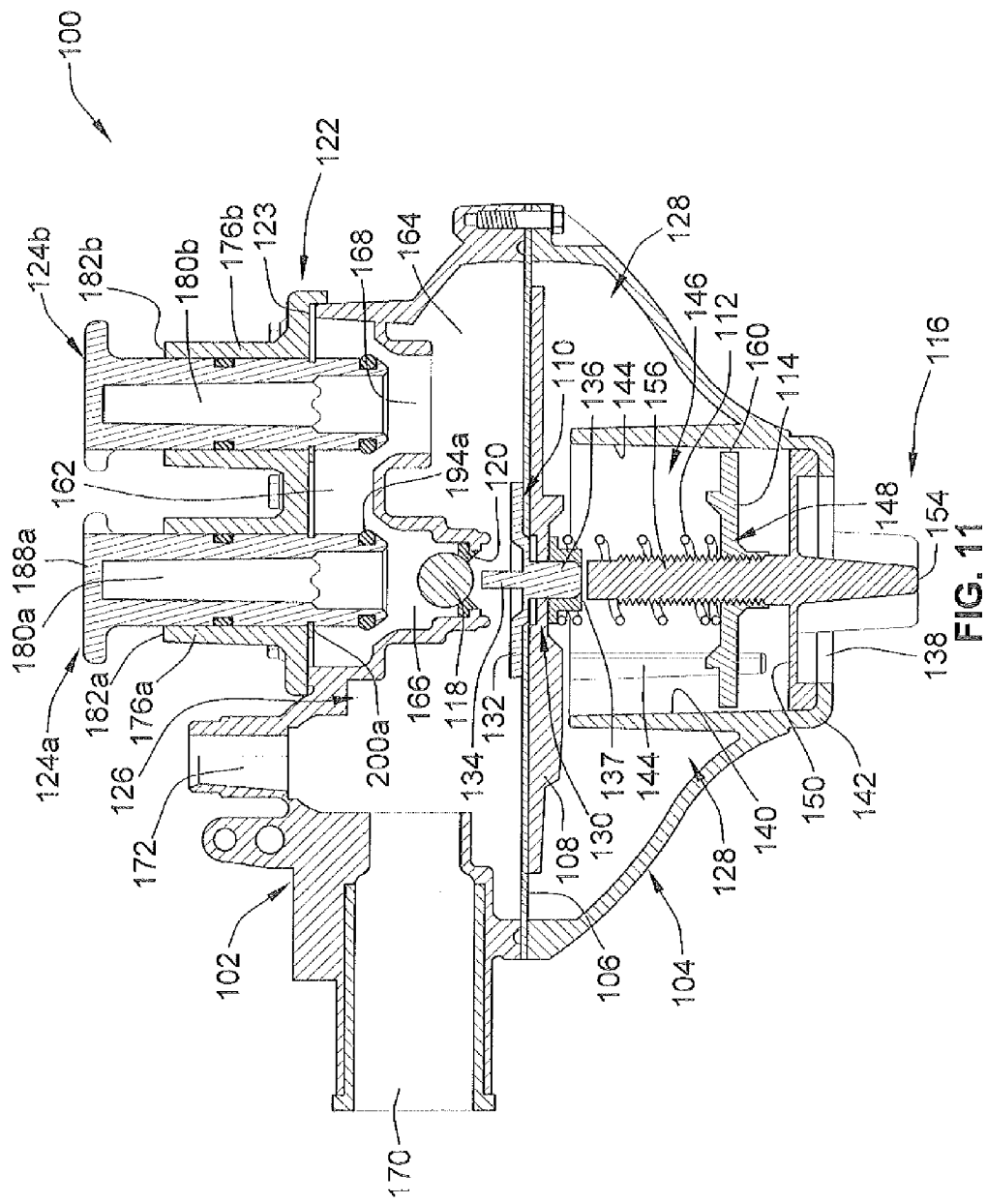
FIG. 11 is a cross-sectional view of the water pressure regulator taken along line 11-11 of FIG. 9.
Figure 12:
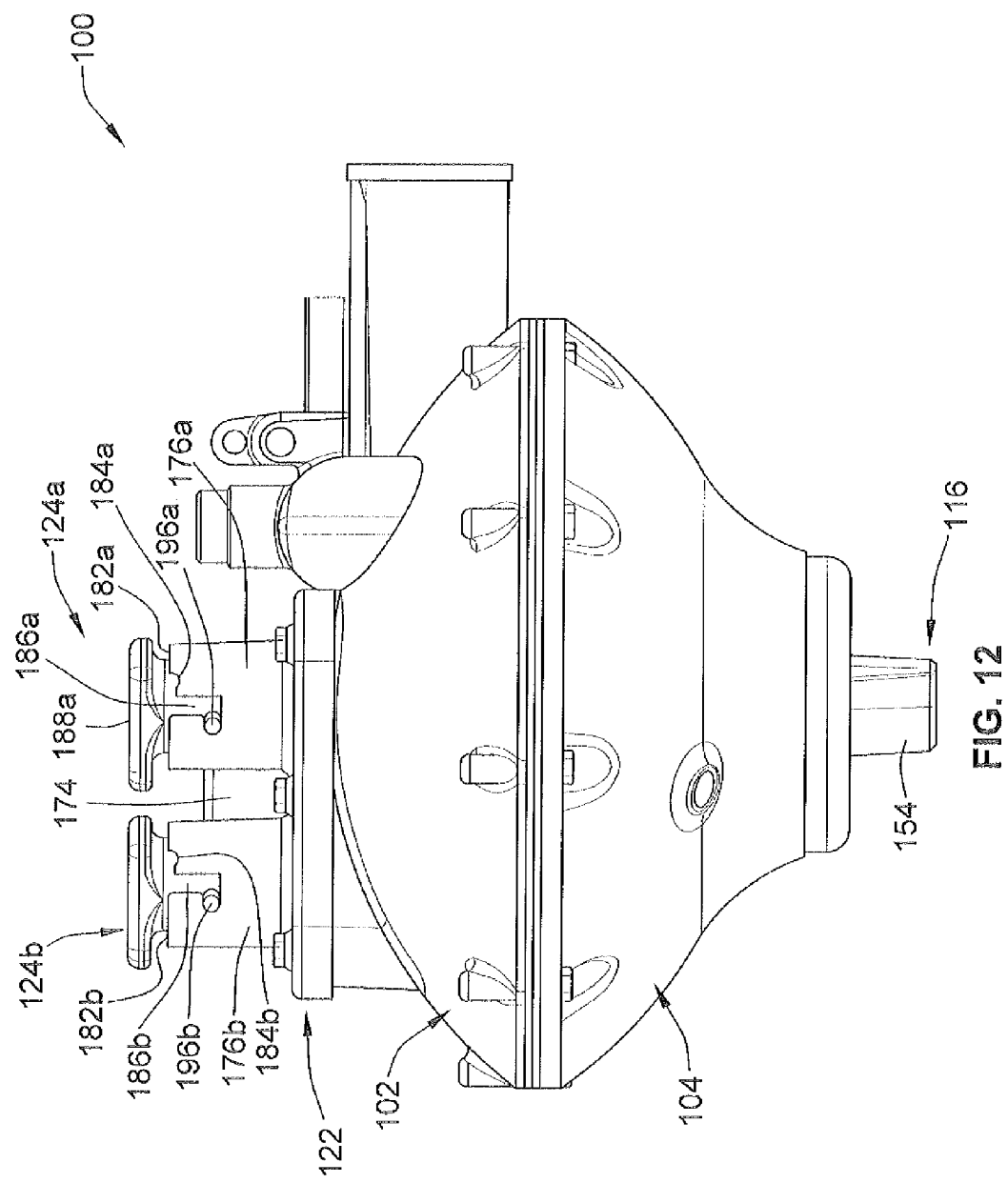
FIG. 12 is a side view of the described embodiment of the water pressure regulator in an "OFF" mode.
Figure 13:
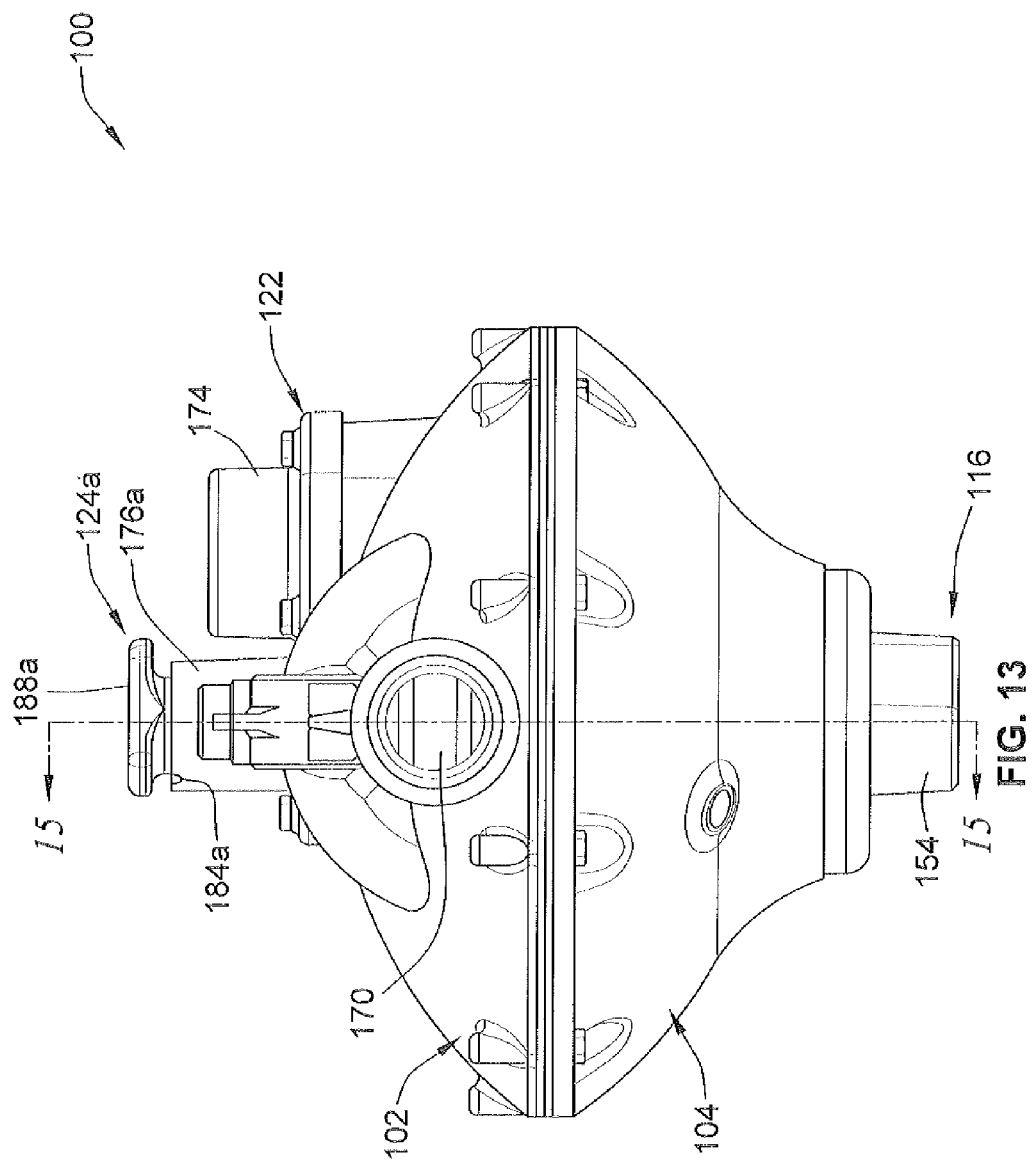
FIG. 13 is an end view of the water pressure regulator illustrated in FIG. 12.
Figure 14:
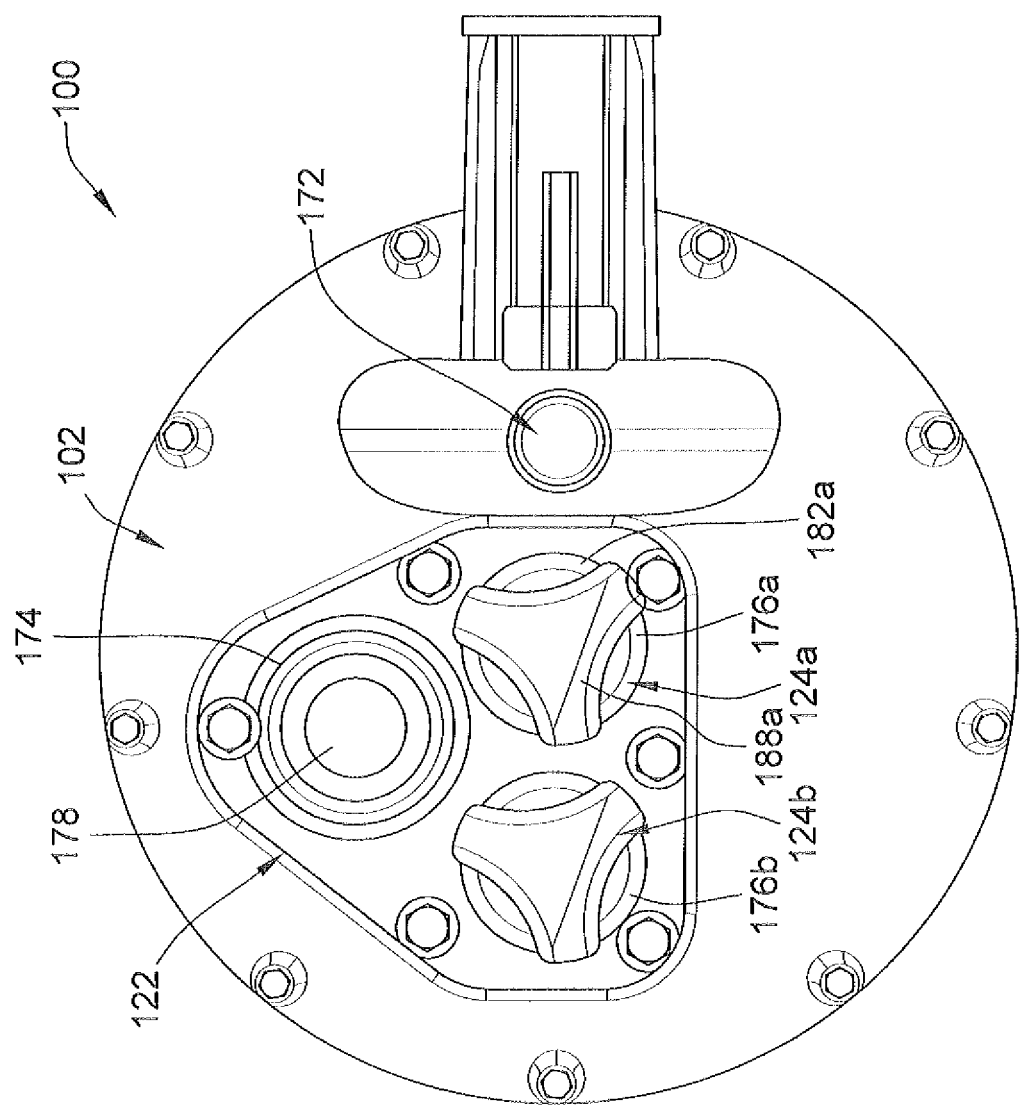
FIG. 14 is a top view of the water pressure regulator illustrated in FIG. 12.
Figure 15:
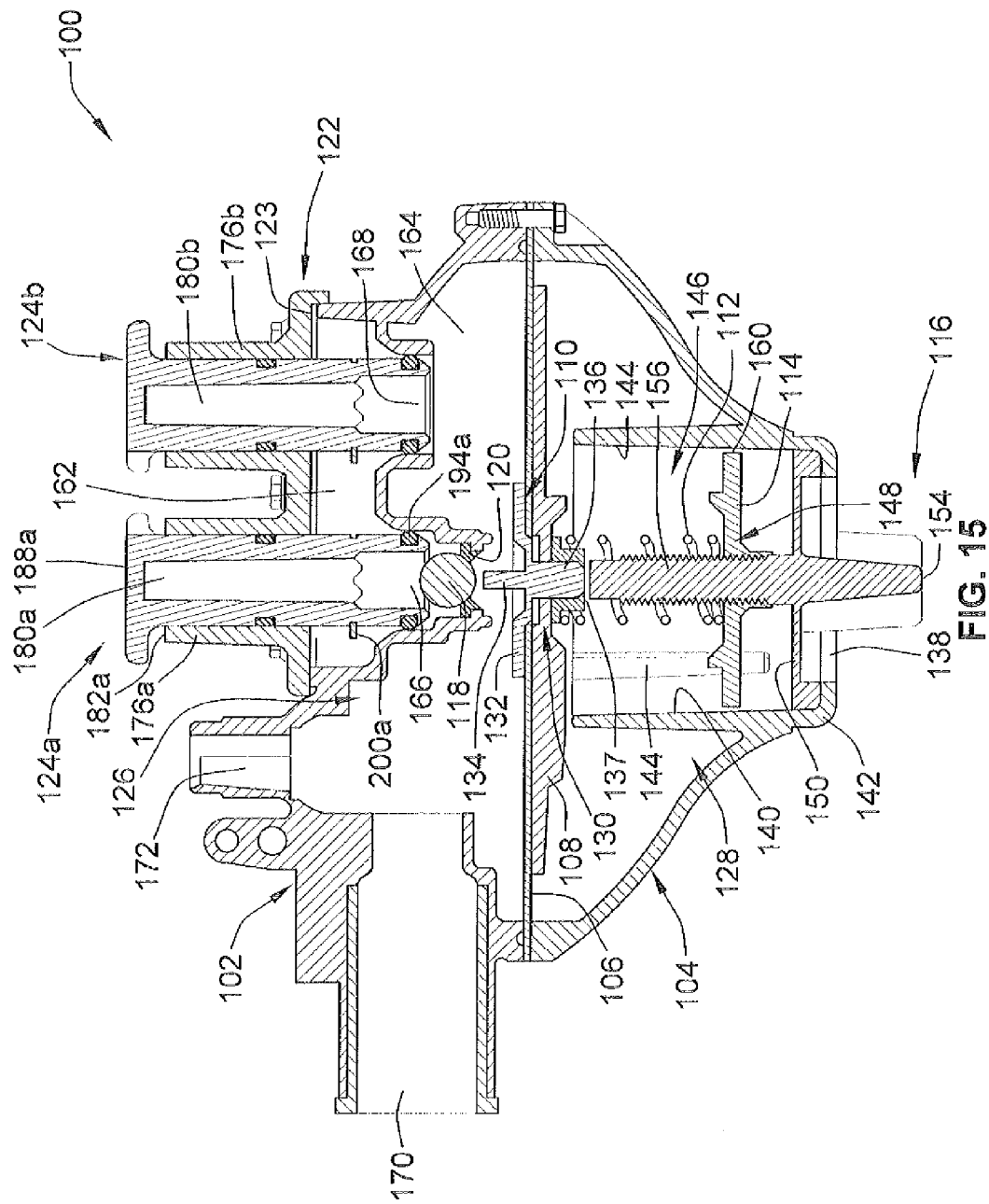
FIG. 15 is a cross-sectional view of the water pressure regulator taken along line 15-15 of FIG. 13.

While the present disclosure is susceptible to various modifications and alternative forms, certain embodiments are shown by way of example in the drawings and these embodiments will be described in detail herein. It will be understood, however, that this disclosure is not intended to limit the invention to the particular form described, but to the contrary, the invention is intended to cover all modifications, alternatives, and equivalents falling within the spirit and scope of the invention defined by the appended claims.

An embodiment of a water pressure regulator 100 is illustrated in FIGS. 1-16. The water pressure regulator 100 is preferably used in a watering system 20 and, more preferably, is used in a watering system 20 for agricultural animals, such as poultry. A typical watering system 20 is illustrated in FIG. 1 and generally includes, but is not limited to, a water source 22, a first water delivery assembly 23 (which typically includes, but is not limited to, a step down regulator and gauge assembly 24, a filter control panel 26, piping 28 and a hose 30), the water pressure regulator 100 and a second water delivery assembly 31 (which typically includes, but is not limited to, an elongated pipe assembly 32, watering nipples 36, catch cups 38 and sight tubes 40, and which may include a support structure 34 and an anti-roost assembly 42). The water pressure regulator 100 of the watering system 20 generally receives water at a relatively high pressure (preferably approximately between 15 and 35 psi) from the source 20 and the first water delivery assembly 23 and delivers water at a relatively low pressure (preferably approximately 1 psi or less) to the second water delivery assembly 31.

The water source 22 is configured to be connected to the step down regulator and gauge assembly 24 in order to provide water thereto. The step down regulator and gauge assembly 24 is configured to receive water from the water source 22 and to reduce the water pressure supplied to the filter control panel 26. The filter control panel 26 is configured to remove foreign material from the incoming water and/or to add medication to the water. The piping 28 delivers the water from the filter control panel 26 to the hose 30. The hose 30 delivers water into the water pressure regulator 100. The water pressure regulator 100 delivers water to the elongated pipe assembly 32 at a lower pressure than that at which it was received in the water pressure regulator 100. The support structure 34 supports the elongated pipe assembly 32, typically from the ceiling or overhead trusses. The watering nipples 36 are connected to the elongated pipe assembly 32 and, upon actuation thereof, for instance by poultry, the watering nipples 36 will deliver water to the poultry. The catch cups 38 are typically secured to the elongated pipe assembly 32 and typically are provided below the watering nipples 36 in order to catch water being delivered from the watering nipples 36 that is not consumed by the poultry, thereby providing another area for poultry to drink from and to prevent watering of the floor of a poultry house. Sight tubes 40 are provided and may be connected to the water pressure regulator 100 or to the elongated pipe assembly 32 in order to allow for visible inspection of the water pressure in the watering system 20 at their location. The anti-roost assembly 42 is typically secured to the support structure 34 above the elongated pipe assembly 32 in order to prevent poultry from roosting on any parts of the watering system 20.

The water pressure regulator 100 includes an upper housing 102, a lower housing 104, a flexible diaphragm 106, a diaphragm support plate 108, a trigger pin 110, a spring 112, a spring support plate 114, a spring adjustment mechanism 116, a sealing member 118, a seat 120, an upper cap 122, a gasket 123, a first plugging member 124a and a second plugging member 124b. The upper housing 102, the lower housing 104, the diaphragm support plate 108, the trigger pin 110, the spring support plate 114, the spring adjustment mechanism 116, the upper cap 122, the first plugging member 124a and the second plugging member 124b are all preferably formed of plastic, but may, of course, be formed of any other suitable material. The diaphragm 106, the sealing member 118 and the gasket 123 are preferably formed of a material which is both elastic and deformable, such as, for example, a synthetic rubber, such as, for example, Neoprene (developed by DuPont), but may, of course, be formed of any other suitable material. The seat 120 is preferably formed of stainless steel, but may, of course, be formed of any other suitable material. The spring 112 is preferably formed of metal, but may, of course, be formed of any other suitable material.

The upper housing 102, the lower housing 104 and the flexible diaphragm 106 are secured together by suitable means, for example screws, such that the flexible diaphragm 106 acts as a water-tight seal between an upper or first chamber 126 and a lower or second chamber 128 of the water pressure regulator 100. The flexible diaphragm 106, the diaphragm support plate 108 and the trigger pin 110 comprise a diaphragm assembly 130. The trigger pin 110 has a base member 132, which is preferably circular/cylindrical in configuration and upper and lower vertically extending leg members 134, 136. The lower vertically extending leg member 136 extends through an aperture of the flexible diaphragm 106 and is fixedly secured to the diaphragm support plate 108 in the lower chamber 128 of the water pressure regulator 100 by appropriate means, such as, for example, by being molded as a threaded male stud, with a nut 137 that is threaded thereon in order to clinch the trigger pin 110 to the diaphragm support plate 108, thus capturing the diaphragm 106 between the diaphragm support plate 108 and the base member 132 of the trigger pin 110 (as illustrated), or alternatively by screws or a snap fit. The diaphragm support plate 108 is likewise positioned in the lower chamber 128 and is configured to support a lower surface of the flexible diaphragm 106. The base member 132 and the upper vertically extending leg member 134 are positioned in the upper chamber 126 of the water pressure regulator 100 and the base member 132 is configured to rest on an upper surface of the flexible diaphragm 106. Thus, both the diaphragm support plate 108 and the trigger pin 110 are rigidly mounted in place to the diaphragm 106.

The lower housing 104 has an opening 138 at a bottom thereof, which is preferably circular in configuration. A wall 140 of the lower housing 104 extends upwardly from around the opening 138 and into the lower chamber 128, and is preferably cylindrical in configuration, but a lower ledge 142 is provided between the wall 140 and the opening 138. The wall 140 also preferably has one or more slots 144 formed therein which extend from above the ledge 142 to the top of the wall 140. The cylindrical area provided between the wall 140, the ledge 142 and the opening 138 (in the preferred configuration) is referred to herein as the spring chamber 146, which is a part of the lower chamber 128.

The spring 112, the spring support plate 114 and the spring adjustment mechanism 116 comprise a spring assembly 148 which is generally provided within the spring chamber 146. The spring adjustment mechanism 116 has a base member 150 which is configured to match the configuration of the spring chamber 146 and, therefore, is preferably cylindrical/circular in configuration. A handle or grip 154 extends downwardly from a lower surface of the base member 150 and a shaft 156, which is preferably threaded, extends upwardly from an upper surface of the base member 150. The base member 150 is configured to be positioned within the spring chamber 146 such that the lower surface of the base member 150 rests on the ledge 142, and such that the base member 150 does not move off of the ledge 142. With the base member 150 in position, the handle or grip 154 extends downwardly through the opening 138 of the lower housing 104 such that the handle or grip 154 can be manipulated from an exterior of the lower housing 104. The shaft 156 likewise then extends upwardly into the spring chamber 146. The base member 150 may have vents (not shown, but which are well-known in the art) extending therethrough in order to allow air to exit or enter the spring chamber 146 as necessary.

The spring support plate 114 has an aperture therethrough which preferably defines a threaded aperture wall. Alternatively, a metal insert, preferably made of brass, may be molded into the spring support plate 114 in order to provide the aperture defining the threaded aperture wall. The shaft 156 is positioned to extend through the aperture and to be threadedly secured to the spring support plate 114. The spring support plate 114 is configured to match the shape of the spring chamber 146 and, therefore, is preferably circular/cylindrical in configuration. Along the periphery of the spring support plate 114, one or more projections 160 extend outwardly therefrom and are configured to be positioned within the slot(s) 144 of the wall 140, in order to prevent rotation of the spring support plate 114 relative to the wall 140.

The spring 112 is preferably a helical spring that winds around the shaft 156 and has one end positioned against an upper surface of the spring support plate 114 and an opposite end positioned against a lower surface of the diaphragm support plate 108, such that the spring 112 is always preferably in compression therebetween.

The upper chamber 126 of the upper housing 102 is separated into first and second zones 162, 164. The first zone 162 is preferably an inlet, high pressure chamber and the second zone 164 is preferably an outlet, low pressure chamber. The base member 132 and the upper vertically extending leg member 134 of the trigger pin 110 are positioned within the second zone 164. The upper housing 102 defines first and second separated passageways 166, 168 which connect the first zone 162 to the second zone 164. The upper housing 102 further defines an outlet passageway 170 (which may be threaded) which extends between the second zone 164 and an exterior of the water pressure regulator 100. Branch lines or elongated pipe assemblies 32 of the watering system 20 are configured to be in fluid communication with the second zone 164 via the outlet passageway 170. The upper housing 102 also may define a sight tube passageway 172 which extends between the second zone 164 and an exterior of the water pressure regulator 100. A sight tube 40 is configured to be in fluid communication with the second zone 164 via the sight tube passageway 172 such that the pressure within the second zone 164 can be readily determined by visual inspection of the water level within the sight tube 40.

The first zone 162 is open at a top thereof. The upper cap 122 is secured to the upper housing 102 by appropriate means, such as by, for example, screws, in order to close off the top of the first zone 162. The gasket 123 is provided between the upper cap 122 and the upper housing 102 in order to ensure that a water-tight seal is maintained. The upper cap 122 has three extensions 174, 176a, 176b which extend upwardly therethrough, each of which define apertures 178, 180a, 180b extending therethrough such that the apertures 178, 180a, 180b are each in fluid communication with the first zone 162. The third extension 176b is identical to the second extension 176a and therefore, will be described with reference numerals ending in "b" while the second extension 176a will be described with reference numerals ending in "a".

The first extension 174 has an internal will defined by the aperture 178 which is preferably threaded. The aperture 178 is an inlet passageway of the water pressure regulator 100 which is configured to receive pressurized water from the supply source 22 by the first water delivery assembly 23.

The second extension 176a has a top edge 182a with a groove 184a and an L-shaped slot 186a formed therein. The aperture 180a through the second extension 176a is positioned above the first passageway 166 of the upper housing 102 and the aperture 180b through the third extension 176b is positioned above the second passageway 168 of the upper housing 102.

The first plugging member 124a is identical to the second plugging member 124h and therefore, the first plugging member 124a will be described with reference numerals ending in "a" while the second plugging member 124b will be described with reference numerals ending in "b". The first plugging member 124a is configured to slide and rotate within the aperture 180a of the second extension 176a while the second plugging member 124b is configured to slide and rotate within the aperture 180a of the third extension 176b.

A first end 188a of the first plugging member 124a is configured as a handle or grip of the first plugging member 124a and is positioned above the top edge 182a of the second extension 176a and outside of the upper cap 122 such that the handle or grip 188a can be manipulated. As the aperture 180a of the second extension 176a is preferably circular/cylindrical, the remainder of the first plugging member 124a other than the first end 188a is likewise preferably circular/cylindrical. The first plugging member 124a also has a first groove around its periphery proximate to a second end 189a of the first plugging member 124a in which an O-ring 194a is preferably positioned. While the first end 188a of the first plugging member 124a is closed off, the second end 189a of the first plugging member 124a may be open such that the first plugging member 124a is hollow. The first plugging member 124a also preferably has a projection 196a extending outwardly from its periphery between the first and second ends 188a, 189a. The first plugging member 124a also preferably has a second groove around its periphery between the first groove and the projection 196a. A ring 200a, preferably formed of metal, is preferably positioned within the second groove and prevents the first plugging member 124a from being pulled out of the aperture 180a of the second extension 176a of the upper cap 122 by being in shear with a lower surface of the upper cap 122.

The seat 120 is secured within the first passageway 166 of the upper housing 102 which separates the first zone 162 from the second zone 164. The seat 120 may be secured in place by any appropriate means, for example by molding or press fit. The seat 120 has an opening therethrough which is smaller in diameter than a diameter of the first passageway 166. The sealing member 118 is configured to rest on the seat 120 in order to block or seal the opening such that fluid communication between the first zone 162 and the second zone 164 via the first passageway 166 is prevented. The sealing member 118 is preferably in the form of a spherical ball.

In operation, the inlet or first extension 174 allows the first zone 162 to receive pressurized water from the supply source 22 via the first water delivery assembly 23. Depending on the positioning of the first and second plugging members 124a, 124b, the water pressure regulator 100 can operate in three separate modes while pressurized water is delivered to the first zone 162, namely the "ON" or "REGULATE" mode, which is illustrated in FIGS. 2-7 (which is the normal operating mode), the "FLUSH" mode, illustrated in FIGS. 8-11, and the "OFF" mode, illustrated in FIGS. 12-15.

Attention is first directed to the "ON" or "REGULATE" mode illustrated in FIGS. 2-7. In the "ON" or "REGULATE" mode, the desired outlet pressure at which water will exit the water pressure regulator 100 via the outlet passageway 170 (typically approximately 1 psi or less) is dictated by the spring assembly 148, which acts on the diaphragm assembly 130. As the spring 112 is always compressed between the diaphragm support plate 108 and the spring support plate 114, and because the vertical position of the spring support plate 114 is locked in position by the spring adjustment mechanism 116, the spring 112 is acting against, or pushing on, the diaphragm assembly 130. The more the spring 112 acts against the diaphragm assembly 130, the higher the pressure will be of the water in the second zone 164 and in the second water delivery assembly 31 of the system 20. Conversely, the less the spring 112 acts against the diaphragm assembly 130, the less the pressure will be of the water in the second zone 164 and in the second water delivery assembly 31 of the system 20.

The compression of the spring 112 can be adjusted as desired by the spring adjustment mechanism 116. The handle or grip 154 of the spring adjustment mechanism 116 can be rotated either clockwise or counterclockwise in order to adjust the compression of the spring 112. In a preferred embodiment, rotation in the clockwise direction of the spring adjustment mechanism 116 causes the spring support plate 114 to move higher up the shaft 156 of the spring adjustment mechanism 116, with the projection(s) 160 moving upward within the slot(s) 144, in order to increase the compression of the spring 112 between the spring support plate 114 and the diaphragm support plate 108. Conversely, in the preferred embodiment, rotation in the counter-clockwise direction of the spring adjustment mechanism 116 causes the spring support plate 114 to move lower down the shaft 156 of the spring adjustment mechanism 116, with the projection(s) 160 moving downward within the slot(s) 144, in order to decrease the compression of the spring 112 between the spring support plate 114 and the diaphragm support plate 108.

In the "ON" or "REGULATE" mode, the first plugging member (the regulator valve) 124a is positioned such that the projection 196a thereon rests in the groove 184a on the top edge 182a of the second extension 176a of the upper cap 122, thus locking the first plugging member 124a in this position (the "raised" or "on" position), whereby the second end of the first plugging member 124a is positioned outside of the first passageway 166 of the upper housing 102, such that water within the first zone 162 can flow into the first passageway 166. Conversely, the second plugging member (the flush valve) 124b is positioned such that the projection 196b rests in the L-shaped slot 186b, thus locking the second plugging member 124b in this position (the "lowered" or "off" position), whereby the second end of the second plugging member 124b is positioned within the second passageway 168 of the upper housing 102, such that water within the first zone 162 is prevented or sealed off from flowing into the second passageway 168 and, thus, into the second zone 164.

Thus, water within the first zone 162 can only exit through the first passageway 166 into the second zone 164. The sealing member 118, however, seals off this water from exiting into the second zone 164 as it closes or seals off the first passageway 166 due to a sealing member force. The sealing member force is determined by a force of the water in the first zone 162 acting upon the sealing member 118, minus a force of the water in the second zone 164 acting upon the sealing member 118, plus a gravitational force acting upon the sealing member 118 due to a weight of the sealing member 118 (while there is a gravitational force acting upon the sealing member 118 due to a weight of the water in the first zone 162, such that there are effects from this gravitational force, the magnitude of this gravitational force is minimal enough to not be considered and, therefore, is considered negligible). The force of the water in the first zone 162 acting upon the sealing member 118 may also cause the sealing member 118 to slightly deform against the seat 120 (as the sealing member 118 is made of a deformable material) in order to ensure that the seal between the sealing member 118 and the seat 120 is water tight. Further forces in the upper chamber 126, other than the sealing member force, also act to prevent the sealing member 118 from becoming unsealed, but they indirectly prevent this from happening, unlike the positive and direct action taken by the sealing member force. More specifically, these other forces include a force of the water in the second zone 164 acting upon the diaphragm assembly 130 and a gravitational force acting upon the diaphragm assembly 130 due to a weight of the water in the second zone 164. The determination of whether the sealing member 118 will seal the first passageway 166 is based on the combination of these forces acting on the diaphragm assembly 130 from within the second zone 164, as well as the sealing member force, relative to the force acting on the diaphragm assembly 130 from within the lower chamber 128 by the spring assembly 148.

For example, when the incoming water pressure is 30 psi, the outgoing water pressure is set at 0.505 psi (variable) and the water temperature is set at 70° F. (variable), the threes at equilibrium are as follows: the sealing member force is 2.99422 pounds (which is determined by the force of the water in the first zone 162 acting upon the sealing member 118, namely 3.03 pounds, minus the force of the water in the second zone 164 acting upon the sealing member 118, namely 0.0382 pounds, plus the gravitational force acting upon the sealing member 118 due to a weight of the sealing member 118, namely 0.00242 pounds (again, while there are effects from the gravitational force that is acting upon the sealing member 118 due to a weight of the water in the first zone 162, the magnitude of these effects is minimal enough to not be considered and, therefore, they are considered negligible), plus the force of the water in the second zone 164 acting upon the diaphragm assembly 130, namely 14.63 pounds, plus the gravitational force acting upon the diaphragm assembly 130 due to a weight of the water in the second zone 164, namely 0.443 pounds, minus the force acting on the diaphragm assembly 130 from within the lower chamber 128 by the spring assembly 148, namely 18.06722 pounds.

As pressure is reduced in the system 20, for example by birds drinking water downstream of the water pressure regulator 100, namely in the second water delivery assembly 31, the force of the water in the second zone 164 acting upon the diaphragm assembly 130 is also reduced (for instance from the 14.63 pounds to 14.50 pounds). When this occurs, the force acting on the diaphragm assembly 130 from within the lower chamber 128 by the spring assembly 148 (namely 18.06722 pounds) is now greater than the combined forces in the upper chamber 126 (namely 17.93722 pounds) that are preventing the scaling member 118 from becoming unsealed, such that the spring 112 pushes up on the diaphragm assembly 130 which, in turn, causes the rigidly-mounted trigger pin 110 to push the sealing member 118 off of the seat 120 in order to allow water from the first zone 162 to enter the second zone 164. Also, because the sealing member 118 is formed from an elastic material, the sealing member 118 will return to its original configuration (in the event it had slightly deformed against the seat 120), i.e., preferably spherical, upon being moved off of the seat 120.

As the pressure is increased in the system 20, downstream of the water pressure regulator 100, the force of the water in the second zone 164 acting upon the diaphragm assembly 130 is increased. When the force of the water in the second zone 164 acting upon the diaphragm assembly 130 becomes equal to or greater than the 14.63 pounds, the three acting on the diaphragm assembly 130 from within the lower chamber 128 by the spring assembly 148 (namely 18.06722 pounds) is now equal to or less than the combined forces in the upper chamber 126 (namely 18.06722 pounds or greater) that are preventing the sealing member 118 from becoming unsealed, such that the diaphragm assembly 130 pushes down on the spring 112 which, in turn, causes the rigidly-mounted trigger pin 110 to move away from the scaling member 118 such that the sealing member 118 again sits on the seat 120, thus preventing or sealing off the first passageway 166 such that water in the first zone 162 cannot move into the second zone 164. Thus, with the water pressure regulator 100 in the "ON" or "REGULATE" mode, the water pressure regulator 100 is always striving to achieve equilibrium. The top of the wall 140 also acts as a limiter to the downward movement of the diaphragm assembly 130 as the diaphragm support plate 108 will bottom out on the top of the wall 140 if pushed down far enough, which prevents the diaphragm 106 from being distorted too much and losing its desired uniform shape.

In the event that the system 20 is to be flushed, for instance to allow for the removal of stale/warm water or water that introduced vitamins or medicine, the water pressure regulator 100 can be changed to the "FLUSH" mode as illustrated in FIGS. 8-11. As can be seen, in this mode, the projection 196*b* of the second plugging member 124*b* is rotated and slid out of the L-shaped slot 186*b* of the third extension 176*b* and then rotated over the groove 184*b* on the top edge 182*b* of the third extension 176*b*, whereby the second plugging member 124*b* is locked into this position (the "raised" or "on" position), such that the second end of the second plugging member 124*b* is not positioned within, or plugging up or sealing, the second passageway 168 of the upper housing 102.

With the second plugging member 124*b* locked into this "raised" or "on" position, the water within the first zone 162 will bypass the first passageway 166 and flow directly through the second passageway 168 into the second zone 164 of the water pressure regulator 100 via the outlet passageway 170. If desired, the first plugging member 124*a* can be rotated and slid such that the projection 196*a* is positioned within the L-shaped slot 186*a* of the second extension 176*a*, thereby locking the first plugging member 124*a* in this "lowered" or "off" position, although it is not necessary. The second end of the first plugging member 124*a* is thus positioned within the first passageway 166, such that pressurized water within the first zone 162 may not come into contact with the sealing member 118 and/or the seat 120, which, over time, could potentially cause damage to one or both of them.

In the event that the system 20 is to be turned off or needs to be isolated, the water pressure regulator 100 can be changed to the "OFF" mode as illustrated in FIGS. 12-15. In this mode, both the first and second plugging members 124*a*, 124*b* are lowered and locked in the "lowered" or "off" positions such that the projections 196*a*, 196*b* are secured within the L-shaped slots 186*a*, 186*b* of the second and third extensions 176*a*, 176*b* of the upper cap 122. Thus, any water within the first zone 162 is prevented or sealed off from entering either the first or second passageways 166, 168 and, thus, the second zone 164.

In both the "FLUSH" mode and the "OFF" mode, the extent of the compression of the spring 112 in the lower chamber 128 is basically irrelevant.

The water pressure regulator 100 thus provides a number of advantages over prior art water pressure regulators.

For instance, for the water pressure regulator 100 to operate properly, the sealing member 118 does not rely on the force of the water in the second zone 164 or the gravitational force acting against the diaphragm assembly due to a weight of the water in the second zone 164 (as to the water pressure regulators of U.S. Pat. Nos. 5,967,167 and 6,202,682) in order for the sealing member 118 to seal the first passageway 166; nor does the sealing member 118 rely on the force acting on the diaphragm assembly from the lower chamber 128 in order for the sealing member 118 to seal the first passageway 166. Rather, the water pressure regulator 100 provides for the sealing member 118 to be provided within the first zone 162 (equivalent to the inlets in the prior art water pressure regulators, namely those of U.S. Pat. Nos. 5,967,167 and 6,202,682) such that the sealing member 118 only relies on the sealing member forces, as described above, to seal the first passageway 166. Thus, a positive and direct seal (i.e., from the force of the water in the first zone 162 acting upon the sealing member 118 and the gravitational force acting upon the sealing member 118 due to a weight of the sealing member 118) prevents water from the supply source 22, via the first water delivery assembly 23, from moving into the second zone 164 from the first zone 162. This configuration is beneficial because it prevents the effects of water hammer from causing wear and tear to the sealing member 118 and to the diaphragm 106. The continuing force of water from the supply source 22 and the first water delivery assembly 23 when the sealing member 118 closes off flow to the second zone 164 by sealing the first passageway 166 is only felt by the sealing member 118, as it acts to further push or seal the sealing member 118 against the seat 120. Thus, the continuing force of water is not felt by the diaphragm 106 and causes no negative effect on the diaphragm 106 itself.

Thus, if desired, this configuration allows for the sealing member 118 to be physically separated from the diaphragm assembly 130, i.e., the sealing device and the triggering device, between the first zone 162 and the second zone 164. Of course, the sealing member 118 and the diaphragm assembly 130 could be physically connected to one another if desired, as the water pressure regulator 100 will still operate in the same manner, i.e., with the sealing member 118 sealing against the seat 120 via gravity (under its own weight) and by the force of the water in the first zone 162 acting upon the sealing member 118, and with the sealing member 118 moving off of the seat 120 when the force acting on the diaphragm assembly 130 from the lower chamber 128 is greater than the combined forces in the upper chamber 126 that are acting to prevent the sealing member 118 from moving off of the seat 120.

Also, in the preferred embodiment, the sealing member 118 is formed of a deformable and elastic material, such as Neoprene rubber, while the seat 120 is formed of stainless steel. This is beneficial because the force of the water in the first zone 162 acting on the sealing member 118 also causes the sealing member 118 to slightly deform against the seat 120, thus ensuring a water tight seal therebetween as the sealing member 118 will completely cover the seat 120 and will conform to the seat 120 (even imperfections therein) to ensure a water-tight seal (which could not be ensured if both the sealing member 118 and the seat 120 were both made of stainless steel under these relatively high pressure conditions, namely, approximately 15-35 psi). This is also beneficial because the sealing member 118 is elastic such that when it is moved off of the seat 120, the sealing member 118 will regain its original shape, which in the preferred embodiment is spherical, thus ensuring that it will continue to properly seal against the seat 120 over extended periods of time.

It should be noted that, instead of the seat 120 being formed of stainless steel, the seat 120 could be formed of plastic and integrally formed with the rest of the upper housing 102. It should also be noted that, if desired, the seat 120 could be formed of the same material as the sealing member 118, namely a deformable and elastic material. If desired, the sealing member 118 could be formed of stainless steel when the seat 120 is formed of a deformable and elastic material.

Yet another advantage is that, in the preferred embodiment, the sealing member 118 is in the shape of a spherical ball. This is beneficial for at least the reason that the sealing member 118 will be able to continuously spin upon being moved by the rigidly-mounted trigger pin 110 such that the spinning ball 118 will, in essence, be polishing the seat 120 and itself in order to remove any buildup of materials from the water thereon, thereby assisting in ensuring that the sealing member 118 and the seat 120 will continue to operate to form a water-tight seal therebetween. It should be noted, however, that, if desired, the sealing member 118 could be in a shape other than a spherical ball, such as an oval or an elongated pin, for example.

Modifications could be made to the water pressure regulator 100 as desired. For example, the second passageway 168, the third extension 176b and the second plugging member 124b could all be removed if the water pressure regulator 100 did not need to operate in the "FLUSH" mode. Also, for example, as illustrated in FIG. 16, the lower housing 104 could be provided with an opening (not shown) that would receive a control pressure conduit 200, which is connected at its other end to a remote pressurized fluid or gas control supply (as generally described and illustrated in U.S. Pat. No. 6,240,956) (not shown), in order to automatically control the pressure in the lower chamber 128, thus overriding the spring assembly 148. In this configuration, the base member 150 would have a groove 202 formed around its periphery in which an O-ring 204 would be positioned in order to create either a water-tight seal (when pressurized fluid is used) or an air-tight seal (when pressurized gas is used). The O-ring 204 would block the vents (not shown) provided through the base member 150 of the spring adjustment mechanism 116.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosed embodiments of the invention and does not pose a limitation on the scope of the invention unless otherwise claimed. No language in the specification should be construed as indicating any non-claimed element as essential to the practice of the invention. It is further to be understood that the drawings are not necessarily drawn to scale.

Preferred embodiments of this invention are described herein, including the best mode known to the inventor for carrying out the invention. It should be understood that the illustrated embodiments are exemplary only, and should not be taken as limiting the scope of the invention.

The invention is claimed as follows:

1. A water pressure regulator comprising:

a body having an inlet, an outlet, a seat, and a diaphragm assembly which is positioned and secured within said body in order to define first and second chambers, said first chamber being provided above said diaphragm assembly and said second chamber being provided below said diaphragm assembly, said diaphragm assembly having a force acting upwardly thereon from within said second chamber, said first chamber further defining first and second zones and a passageway therebetween, the seat being secured within said passageway, said inlet configured to provide water to said first zone, said outlet configured to deliver water out of said second zone, said second zone being positioned between said first zone and said diaphragm assembly; and a sealing member wholly positioned within said first zone, said sealing member being unattached from every part of the water pressure regulator, said sealing member configured to seal and unseal said passageway, wherein when the sealing member is sealing the passageway, the sealing member is seated against the seat and the sealing member is not in a biased relationship with the diaphragm assembly, and wherein the diaphragm assembly is configured to bias the sealing member to unseat the sealing member from the seat, and thereby unseal the passageway, whereby when the sealing member is unsealed from the passageway, the sealing member continuously spins to remove any foreign materials which may have built up on one or both of the sealing member and the seat, thereby aiding in ensuring that the sealing member and the seat will continue to operate to form a seal therebetween when the sealing member is not in a biased relationship with the diaphragm assembly.

2. The water pressure regulator as defined in claim 1, wherein said sealing member is formed of a deformable material whereby, when said sealing member is seated against the seat and sealing the passageway, said sealing member is configured to slightly deform against said seat, thereby further enhancing the seal of said passageway.

3. The water pressure regulator as defined in claim 2, wherein said sealing member is formed of an elastic material whereby said sealing member can return to its original shape after it has been slightly deformed against said seat.

4. The water pressure regulator as defined in claim 1, wherein at least one of said sealing member and said seat are formed of a deformable and elastic material.

5. The water pressure regulator as defined in claim 4, wherein said deformable and elastic material is a synthetic rubber.

6. The water pressure regulator as defined in claim 4, wherein said sealing member is formed of said deformable and elastic material and said seat is formed of stainless steel.

7. The water pressure regulator as defined in claim 1, wherein said sealing member is a spherical ball.

8. The water pressure regulator as defined in claim 1, wherein said sealing member is formed of a deformable and elastic material.

9. The water pressure regulator as defined in claim 1, wherein said diaphragm assembly comprises a diaphragm and a trigger pin, said diaphragm being secured and positioned within said body to separate said first chamber from said second chamber, said trigger pin having a leg member extending outwardly from a first surface of said diaphragm and being positioned within said second zone, said leg member configured to bias said sealing member to unseal said passageway.

10. The water pressure regulator as defined in claim 9, wherein said diaphragm assembly further comprises a diaphragm support plate which is positioned in the second chamber and which is configured to support a second surface of said diaphragm.

11. The water pressure regulator as defined in claim 10, wherein said trigger pin further comprises a base portion and a second leg member, said base portion being positioned in said second zone and being configured to rest on said first surface of said diaphragm, said outwardly extending leg member extending from said base portion and being substantially positioned in said second zone, said second leg member extending outwardly from said base portion through an aperture in said diaphragm and being secured to said diaphragm support plate.

12. The water pressure regulator as defined in claim 1, further comprising a first plugging member which is movable between a first locked position and a second locked position, wherein said first chamber further defines a second, separate passageway provided between said first zone and said second zone, wherein when said first plugging member is in said first locked position, said first plugging member plugs said second passageway, thereby preventing the water in said first zone from moving through said second passageway and into said second zone, and wherein when said first plugging member is in said second locked position, said first plugging member is unplugged from said second passageway, thereby allowing the water in said first zone to move through said second passageway and into said second zone.

13. The water pressure regulator as defined in claim 12, wherein said body defines an extension having an aperture provided therethrough which is in communication with said first zone, said aperture of said extension being positioned in line with said second passageway, said first plugging member being movable within said aperture of said extension between said first locked position and said second locked position.

14. The water pressure regulator as defined in claim 13, wherein said extension has an L-shaped slot formed therein and a free edge with a groove, and wherein said first plugging member has a projection extending outwardly therefrom, wherein when said first plugging member is in said first locked position, said projection of said first plugging member is positioned within said L-shaped slot, and wherein when said first plugging member is in said second locked position, said projection of said first plugging member is positioned within said groove.

15. The water pressure regulator as defined in claim 12, further comprising a second plugging member which is movable between a first locked position and a second locked position, wherein when said second plugging member is in said first locked position, said second plugging member plugs said first passageway, thereby preventing the water in said first zone from moving through said first passageway and into said second zone, and wherein when said second plugging member is in said second locked position, said second plugging member is unplugged from said first passageway, thereby allowing the water in said first zone to move through said first passageway and into said second zone.

16. The water pressure regulator as defined in claim 15, wherein said body defines an extension having an aperture provided therethrough which is in communication with said first zone, said aperture of said extension being positioned in line with said first passageway, said second plugging member being movable within said aperture of said extension between said first locked position and said second locked position.

17. The water pressure regulator as defined in claim 16, wherein said extension has an L-shaped slot formed therein and a free edge with a groove, and wherein said second plugging member has a projection extending outwardly therefrom, wherein when said second plugging member is in said first locked position, said projection of said second plugging member is positioned within said L-shaped slot, and wherein when said second plugging member is in said second locked position, said projection of said second plugging member is positioned within said groove.

18. The water pressure regulator as defined in claim 1, wherein said first chamber further defines a second, separate passageway provided between said first zone and said second zone, and further comprising first and second plugging members which are each movable between first locked positions and second locked positions, wherein when said first and second plugging members are in said first locked positions, said first and second plugging members plug said first and second passageways, respectively, thereby preventing the water in said first zone from moving through said first and second passageways, respectively, and into said second zone, and wherein when said first and second plugging members are in said second locked positions, said first and second plugging members do not plug said first and second passageways, respectively, thereby allowing the water in said first zone to move through said first and second passageways, respectively, and into said second zone.

19. The water pressure regulator as defined in claim 18, wherein when said first plugging member is in said second locked position and said second plugging member is in said first locked position, said water pressure regulator is configured to be in an "on" or "regulate" mode, whereby the water in said first zone is only allowed to move into said second zone through said first passageway.

20. The water pressure regulator as defined in claim 18, wherein when said first plugging member is in said first locked position and said second plugging member is in said first locked position, said water pressure regulator is configured to be in a "flush" mode, whereby the water in said first zone is only allowed to move into said second zone through said second passageway.

21. The water pressure regulator as defined in claim 18, wherein when said first plugging member is in said second locked position and said second plugging member is in said second locked position, said water pressure regulator is configured to be in an "off" mode, whereby the water in said first zone is prevented from moving into said second zone through either said first passageway or said second passageway.

22. The water pressure regulator as defined in claim 18, wherein each of said first and second plugging members are configured to at least partially extend outside of said body such that each of said first and second plugging members can be manipulated by a user between said first and second locked positions.

23. The water pressure regulator as defined in claim 1, wherein said body further defines sight tube passageway which is in fluid communication with said second zone such that a sight tube operably associated with said sight tube passageway will allow for a pressure of the water within said second zone to be readily determined by visual inspection of the sight tube.

24. The water pressure regulator as defined in claim 1, wherein the force acting on said diaphragm assembly from within said second chamber is applied by a spring assembly that is generally housed within said second chamber.

25. The water pressure regulator as defined in claim 24, wherein the body further includes an opening, a wall and a ledge provided between said wall and said opening, wherein an area provided between said wall, said ledge and said opening defines a spring chamber within said lower chamber of said body, said spring assembly being generally housed within said spring chamber.

26. The water pressure regulator as defined in claim 25, wherein said spring assembly comprises a spring adjustment mechanism having a base, a handle and a threaded shaft, said base being positioned within said spring chamber and configured to rest on said ledge, said handle configured to extend outwardly from said base and through said opening in said body such that said handle can be manipulated exterior to said body, said threaded shaft configured to extend outwardly from said base within said spring chamber, a spring support plate having an aperture therethrough defining a threaded aperture wall, said spring support plate being positioned within said spring chamber, said threaded shaft of said spring adjustment mechanism being threadedly engaged within said threaded aperture wall of said spring support plate such that said spring support plate can move along said threaded shaft of said spring adjustment mechanism within said spring chamber upon rotation of said spring adjustment mechanism by said handle, and a spring having first and second ends which are positioned in said spring chamber, said first end of said spring being positioned against said spring support plate and said second end of said spring being positioned against said diaphragm assembly such that said spring is held in compression therebetween.

27. The water pressure regulator as defined in claim 26, wherein said spring is a helical spring which winds around said threaded shall of said spring adjustment mechanism.

28. The water pressure regulator as defined in claim 26, wherein said wall has at least one slot provided therein which generally extends from a first end thereof proximate to said base of said spring adjustment mechanism to a second end thereof proximate to said diaphragm assembly, and wherein said spring support plate has at least one projection extending outwardly therefrom which is configured to be positioned within said at least one slot of said wall in order to prevent rotation of said spring support plate relative to said wall.

29. The water pressure regulator as defined in claim 26, wherein the more said spring is compressed within said spring chamber, the higher the force acting on said diaphragm assembly from said second chamber, and wherein the less said spring is compressed within said spring chamber, the lower the force acting on said diaphragm assembly from said second chamber.

30. The water pressure regulator as defined in claim 1, wherein a pressure of the water provided to said first zone is higher than a pressure of the water delivered out of said second zone.

31. The water pressure regulator as defined in claim 30, wherein the pressure of the water provided to said first zone is approximately between 15 and 35 psi, and wherein the pressure of the water delivered out of said second zone is approximately 1 psi or less.

32. A watering system comprising:
a water source;
a pressure regulator comprising
a body having an inlet, an outlet, a seat, and a diaphragm assembly which is positioned and secured within said body in order to define first and second chambers, said first chamber being provided above said diaphragm assembly and said second chamber being provided below said diaphragm assembly, said diaphragm assembly having a force acting upwardly thereon from within said second chamber, said first chamber further defining first and second zones and a passageway therebetween, the seat being secured within said passageway, said inlet configured to provide water to said first zone, said outlet configured to deliver water out of said second zone, said second zone being positioned between said first zone and said diaphragm assembly, and
a sealing member wholly positioned within said first zone, said sealing member being unattached from every part of the water pressure regulator, said sealing member configured to seal and unseal said passageway, wherein when the sealing member is sealing the passageway, the sealing member is seated against the seat and the sealing member is not in a biased relationship with the diaphragm assembly, and wherein the diaphragm assembly is configured to bias the sealing member to unseat the sealing member from the seat, and thereby unseal the passageway, whereby when the sealing member is unsealed from the passageway, the sealing member continuously spins to remove any foreign materials which may have built up on one or both of the sealing member and the seat, thereby aiding in ensuring that the sealing member and the seat will continue to operate to form a seal therebetween when the sealing member is not in a biased relationship with the diaphragm assembly;
a first water delivery system which is connected at a first end thereof to said water source and at a second end thereof to said inlet in order to supply water to said first zone; and
a second water delivery system which is connected at a first end thereof to said outlet of said pressure regulator in order to deliver water from said second zone.

33. The watering system as defined in claim 32, wherein said sealing member is formed in the shape of a spherical ball.

* * * * *